(12) United States Patent
Veya

(10) Patent No.: US 12,515,470 B2
(45) Date of Patent: Jan. 6, 2026

(54) UV-VIS RADIATION CURABLE SECURITY INKS

(71) Applicant: SICPA HOLDING SA, Prilly (CH)

(72) Inventor: Patrick Veya, Aclens (CH)

(73) Assignee: SICPA HOLDING SA, Prilly (CH)

( * ) Notice: Subject to any disclaimer, the term of this patent is extended or adjusted under 35 U.S.C. 154(b) by 793 days.

(21) Appl. No.: 17/909,685

(22) PCT Filed: Mar. 3, 2021

(86) PCT No.: PCT/EP2021/055299
§ 371 (c)(1),
(2) Date: Sep. 6, 2022

(87) PCT Pub. No.: WO2021/175907
PCT Pub. Date: Sep. 10, 2021

(65) Prior Publication Data
US 2023/0150287 A1  May 18, 2023

(30) Foreign Application Priority Data

Mar. 5, 2020  (EP) ..................................... 20161164
Sep. 18, 2020 (EP) ..................................... 20196914

(51) Int. Cl.
| | | |
|---|---|---|
| B41M 3/14 | (2006.01) | |
| B41M 1/12 | (2006.01) | |
| B41M 7/00 | (2006.01) | |
| C09D 11/037 | (2014.01) | |
| C09D 11/101 | (2014.01) | |

(52) U.S. Cl.
CPC ............. B41M 3/14 (2013.01); B41M 1/12 (2013.01); B41M 7/0081 (2013.01); C09D 11/037 (2013.01); C09D 11/101 (2013.01)

(58) Field of Classification Search
CPC ........ B41M 3/14; B41M 1/12; B41M 7/0081; C09D 11/037; C09D 11/101
See application file for complete search history.

(56) References Cited

U.S. PATENT DOCUMENTS

| | | | |
|---|---|---|---|
| 4,705,300 | A | 11/1987 | Berning et al. |
| 4,705,356 | A | 11/1987 | Berning et al. |
| 4,721,271 | A | 1/1988 | Goldstein et al. |
| 5,084,351 | A | 1/1992 | Philips et al. |
| 5,214,530 | A | 5/1993 | Coombs et al. |
| 5,281,480 | A | 1/1994 | Phillips et al. |
| 5,383,995 | A | 1/1995 | Phillips et al. |
| 5,418,301 | A | 5/1995 | Hult et al. |
| 5,569,535 | A | 10/1996 | Phillips et al. |
| 5,571,624 | A | 11/1996 | Phillips et al. |
| 8,147,932 | B2 | 4/2012 | Despland et al. |
| 9,914,846 | B2 | 3/2018 | Reiter et al. |
| 10,982,102 | B2 | 4/2021 | Hoggett et al. |
| 2002/0096087 | A1 | 7/2002 | Glausch |
| 2004/0069187 | A1 | 4/2004 | Umehara et al. |
| 2008/0090930 | A1 | 4/2008 | Madhusoodhanan et al. |
| 2013/0196125 | A1* | 8/2013 | Toyoda .................. C09D 11/38 428/206 |
| 2015/0166799 | A1 | 6/2015 | Schoenefeld et al. |
| 2015/0174945 | A1 | 6/2015 | Garnier et al. |
| 2016/0130461 | A1 | 5/2016 | Reiter et al. |
| 2016/0207344 | A1 | 7/2016 | Klein et al. |
| 2018/0148379 | A1 | 5/2018 | Schaedler et al. |

FOREIGN PATENT DOCUMENTS

| | | |
|---|---|---|
| CN | 110049875 | 7/2019 |
| EP | 1090963 | 4/2001 |
| JP | 2000273399 | 10/2000 |
| JP | 2003261817 | 9/2003 |
| JP | 2004244562 | 9/2004 |
| JP | 2004291437 | 10/2004 |
| JP | 2004346246 | 12/2004 |
| JP | 2007070450 A * | 3/2007 |
| JP | 2007291239 | 11/2007 |
| JP | 2013158933 | 8/2013 |
| TW | 201402355 | 1/2014 |
| WO | 2003020834 | 3/2003 |
| WO | 2006117271 | 11/2006 |
| WO | 2007060133 | 5/2007 |
| WO | 2008148201 | 12/2008 |
| WO | 2010115986 | 10/2010 |
| WO | 2013119387 | 8/2013 |
| WO | 2014131479 | 9/2014 |
| WO | 2016005158 | 1/2016 |
| WO | 2017129666 | 8/2017 |
| WO | 2019179460 | 9/2019 |
| WO | 2019219250 | 11/2019 |

OTHER PUBLICATIONS

English machine translation of JP-2007070450-A (Year: 2007).*
First Examination Report (Office Action) issued in counterpart Indian Application No. 202217055754 dated Jan. 16, 2023, 5 pages.
Handbook of Print Media, Helmut Kipphan, Springer Edition, 2001, p. 48.
Printing Technology, J. M. Adams and P.A. Dolin, Delmar Thomson Learning, 5th Edition, 2002, pp. 359-360.
The Printing Ink Manual, R.H. Leach and R.J. Pierce, Springer Edition, 5th Edition, 2008, pp. 58-62.
Printing Technology, J. M. Adams and P.A. Dolin, Delmar Thomson Learning, 5th Edition, 2002, pp. 293-328.

(Continued)

*Primary Examiner* — Amber R Orlando
*Assistant Examiner* — Jeffrey Eugene Barzach
(74) *Attorney, Agent, or Firm* — MUNCY, GEISSLER, OLDS & LOWE, P.C.

(57) ABSTRACT

The present invention relates to the field of security inks suitable for printing security features on substrates, in particular on security documents or articles as well as security features made from said security inks, and security documents comprising a security feature made from said security inks. In particular, the invention provides UV-Vis radiation cationically curable security inks and UV-Vis radiation curable hybrid security inks comprising an ink vehicle and pigments comprising a flake-shaped non-metallic or metallic substrate comprising one or more at least partial coating layers, an at least partial surface treatment layer made of one or more surface modifiers based on perfluoropolyethers.

15 Claims, No Drawings

(56) References Cited

OTHER PUBLICATIONS

Handbook of Print Media, H. Kipphan, Springer, 2001, pp. 409-422 and pp. 498-499.
"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
Industrial Photoinitiators, W. A. Green, CRC Press, 2010, Table 8.1 p. 170.
International Search Report and Written Opinion issued with respect to application No. PCT/EP2021/055299.
Chinese Patent Office Action in counterpart Chinese Application No. CN202180018670.4 dated Feb. 2, 2023 (and English language translation of Office Action).
Japanese Office Action in counterpart Japanese Patent Application No. P2022-552561 dated Jan. 7, 2025 (and English language translation of Office Action).

* cited by examiner

UV-VIS RADIATION CURABLE SECURITY INKS

The present invention relates to the field of security inks suitable for printing security features on substrates, in particular on security documents or articles.

BACKGROUND OF THE INVENTION

With the constantly improving quality of color photocopies and printings and in an attempt to protect security documents such as banknotes, value documents or cards, transportation tickets or cards, tax banderols, and product labels that have no reproducible effects against counterfeiting, falsifying or illegal reproduction, it has been the conventional practice to incorporate various security means features in these documents.

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

Examples of overt security features include reflective features and optically variable features, wherein said security features exhibit a color shift or color change, expressed by a change of the lightness and/or chroma and/or hue, upon variation of the angle of observation. Typically, said security features are made from inks comprising flake-shaped multilayer interference pigments.

WO 2003/020834 A1 discloses water-based security inks comprising flake-shaped multilayer interference pigments for producing optically variable security features. With the aim of avoiding or reducing corrosion of the pigments in the water-based inks, the surface of said pigments is treated by a passivating agent such as for example fluorinated organic esters of phosphoric acid. However, water-based security inks may be difficult to print and result in a long drying process.

WO 2006/117271 A1 discloses solvent-based security inks comprising flake-shaped multilayer interference pigments for producing optically variable security features. However, the increasing sensitivity of the public to environmental concerns, as well as the necessary responsiveness of the chemical industry to environmental regulations such as REACH and GHS, have resulted in the formulation of inks containing a significantly reduced amount of organic solvent (volatile organic components, VOC) and have motivated the industry to develop UV-Vis radiation curable screen printing inks comprising said flake-shaped pigments.

It is known in the art that the perceived optical characteristics of reflective features and optically variable features comprising flake-shaped pigments depend on said flake-shaped pigments orientation in the dried ink on a substrate. Whereas the gradual drying process of water-based or solvent-based inks comprising flake-shaped pigments advantageously allows a reduction of the thickness of said applied inks and allows the flake-shaped pigments to orient themselves substantially parallel to the substrate onto which said inks are applied and thus produce reflective features and optically variable exhibiting good optical characteristics, the instantaneous hardening process of UV-Vis radiation curable inks comprising flake-shaped pigment and the substantially unchanged thickness of the cured ink layer may lead to a random orientation of said pigments and thus produce reflective features and optically variable that may exhibit poor optical characteristics.

With the aim of improving the striking effect and the optical properties of reflective features and optically variable security features based on flake-shaped pigments, said pigments have been surface treated with hydrophobic compounds so that they arrange more readily in a plane substantially parallel to the substrate onto which inks comprising said pigments are applied. Surface treated pigments are referred in the literature as leafing pigments.

EP 1 090 963 A1 discloses flaky iridescent pigments being surface treated with fluorine-containing phosphates as well as inks, paints, plastics or cosmetics comprising said pigments. EP 1 090 963 A1 discloses a solvent-based gravure printing ink.

US 2002/0096087 discloses platelet-shaped pearl luster pigments on the basis of a platelet-shaped pigment containing at least one organic hydrophobic coupling agent such as for example fluorine-containing silanes and their use in paints, inks, plastics, coatings and cosmetics.

US 2004/0069187 discloses flaky pigments coated with a coupling agent and an organic compound having a perfluoroalkyl group and their use in printing inks.

US 2015/0166799 disclosed flake-form effect pigments coated with an organic coating which contains fluoroalkyl groups and hydrophilic groups built up from at least one siloxane and/or at least one silane and their use in many applications and their use in paints, inks, plastics, coatings and cosmetics.

US 2016/0207344 discloses a printed image which consists of at least two area units on a substrate, where a first area unit comprises first flake-form effect pigments comprising an outer layer comprising a non-metallic, inorganic material, and a second area unit comprises a second flake-form effect pigments, comprising an outer layer comprising an organic surface modifier such as organofunctional siloxanes contain fluoroalkyl groups and aminoalkyl groups. US 2016/0207344 discloses printing inks which may be solvent-based inks or UV curable inks.

WO 2013/119387 A1 discloses UV radiation radically curable metallic decorative composition comprising leafing metallic pigment flakes, an acrylate oligomer and/or an acrylate monomer, an initiator or mixture of initiators, and a cure accelerator that is a tertiary amine. The disclosed leafing metallic pigment flakes are surface treated with fatty acids, phosphorous compounds, silane or aliphatic amines. The disclosed UV-Vis radiation curable ink suffers from poor optical properties including a poor visual appearance and from a low chroma.

JP 2004244562 discloses UV radiation cationically curable inks comprising leafing aluminum pigments surface treated with stearic acid, a cationic photoinitiator and a hydroxyl fatty acid to improve defoaming properties of said inks. However, the use of a cationic photoinitiator in compositions comprising aluminum pigments surface treated with stearic acid results in the substitution of the stearic acid by the acid generated by the cationic photoinitiator and thus results in the loss of leafing effect and loss of the optical properties obtained therefrom.

JP 2000273399 discloses a UV cationically or radically curable film-forming composition containing aluminum powder being treated with an alkyl surfactant (stearic acid). Such treatment does not allow to orient the aluminum flakes parallel to the substrate surface at industrial printing speed, thus leading to cured coatings with inferior poor optical characteristics.

JP 2003261817 discloses a UV cationically curable composition containing an aluminum pigment and an amine. The disclosed compositions do not allow a sufficiently fast development of the metallic shine in a high-speed, industrial printing process thus leading to cured coatings with poor optical properties.

U.S. Pat. No. 9,914,846 discloses radiation-curing coating compositions comprising a modified effect pigment, wherein said effect pigment is coated with at least one layer of a metal oxide and comprises silicon dioxide, aluminum oxide, titanium dioxide, iron oxide, tin oxide, zinc oxide or mixtures thereof, and at least one organic compound having one or more functional groups with a carbon-carbon multiple bond. It is further disclosed that the organic compound is bound to the layer of a metal oxide and that the suitable modified effect pigment has no organic oligomers or polymers. U.S. Pat. No. 9,914,846 discloses coating compositions comprising conventional UV curable compounds wherein both radically polymerizable and cationically polymerizable binders can be used. The exemplified compositions are acrylate-based radically curable UV printing inks comprising aluminum pigments coated with $SiO_2$ and comprising a methacrylate-functional silane compound. Since the surface tension of the coating matrix is not optimized, a sufficiently fast orientation of the effect pigments at industrial printing speed cannot be obtained, thus leading to comparatively poor optical characteristics.

Therefore, a need remains for solvent-free or low VOC containing UV-Vis radiation curable security inks being cationically curable inks or hybrid inks, in particular for highly demanding applications requiring high counterfeiting resilience and excellent optical properties. In particular, there is a need for UV-Vis radiation curable security inks for producing reflective features and optically variable features based on flake-shaped multilayer interference pigments, wherein said security features exhibit improved optical characteristics in terms of chroma, lightness and/or color shifting properties.

SUMMARY

Accordingly, it is an object of the present invention to overcome the deficiencies of the prior art as discussed above.

In a first aspect, the present invention provides UV-Vis radiation curable security inks comprising:
  i) from about 75 wt-% to about 99 wt-% of an ink vehicle having a viscosity between about 200 and about 2000 mPas at 25° C. and comprising:
    a) a1) from 45 wt-% to about 75 wt-% of one or more cycloaliphatic epoxides and a2) from about 2 wt-% to about 15 wt-% of one or more cationic photoinitiators being onium salts, preferably being selected from the group consisting selected from the group consisting of oxonium salts, iodonium salts, sulfonium salts and mixtures thereof, or
    b) b1) from about 45 wt-% to about 75 wt-% of a mixture comprising one or more cycloaliphatic epoxides and one or more radically curable compounds selected from the group consisting of tri (meth)acrylates, tetra(meth)acrylates and mixtures thereof and b2) from about 2 wt-% to about 15 wt-% of a mixture of one or more cationic photoinitiators being onium salts, preferably being selected from the group consisting selected from the group consisting of oxonium salts, iodonium salts, sulfonium salts and mixtures thereof and one or more free radical photoinitiators, preferably selected from the group consisting of hydroxyketones, alkoxyketones, acetophenones, benzophenones, ketosulfones, benzyl ketals, benzoin ethers, phosphine oxides, phenylglyoxylates, thioxanthones, and mixtures thereof, more preferably selected from the group consisting of phosphine oxides, thioxanthones, alpha-hydroxyketones, and mixtures thereof,
    c) the ink vehicle optionally comprising one or more vinyl ethers in an amount less than about 20 wt-%, or one or more oxetanes in an amount less than or equal to about 30 wt-% or a combination of one or more vinyl ethers and one or more oxetanes in an amount less than or equal to about 15 wt-%, the weight percents of a), b) and c) being based on the total weight of the ink vehicle; and
  ii) from about 1 to about 25 wt-% of pigments comprising a flake-shaped non-metallic or metallic substrate, wherein said non-metallic or metallic substrate comprises one or more at least partial coating layers independently made of one or more metal oxides, one or more metal oxide hydrates, one or more metal suboxides or mixtures of these materials and comprises an at least partial surface treatment layer facing the environment, being in direct contact with the top layer of the one or more at least partial coating layers and made of one or more surface modifiers selected from perfluoropolyethers, said perfluoropolyethers being functionalized with one or more phosphor (P) containing groups or one or more silicon (Si) containing groups,
  the weight percent of i) and ii) being based on the total weight of UV-Vis radiation curable security ink.

Also described herein are uses of the UV-Vis radiation curable security inks described herein, preferably the UV-Vis radiation curable screen printing security inks described herein, for manufacturing one or more security features on a security document or article and security features obtained thereof.

Also described herein are security features made from the UV-Vis radiation curable security inks described herein, preferably the UV-Vis radiation curable screen printing security inks described herein.

Also described herein are articles comprising a substrate and a radiation cured coating obtained by radiation curing of the UV-Vis radiation curable security inks described herein, preferably the UV-Vis radiation curable screen printing security inks described herein.

Also described herein are methods for producing the article described herein, comprising the steps of:
  a) printing, preferably by a printing process selected from the group consisting of rotogravure processes, flexography processes and screen printing processes, more preferably selected from the group consisting of screen printing processes the UV-Vis radiation curable security inks described herein, preferably the UV-Vis radiation curable screen printing security inks described herein on the substrate, and b) curing the UV-Vis radiation curable security ink so as to form one or more security features.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

As used herein, the term "at least" is meant to define one or more than one, for example one or two or three.

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consist of A and B, or (essentially) consist of A, B and C.

Where the present description refers to "preferred" embodiments/features, combinations of these "preferred" embodiments/features are also deemed to be disclosed as long as the specific combination of "preferred" embodiments/features is technically meaningful.

The term "security document" refers to a document which is usually protected against counterfeit or fraud by at least one security feature. Examples of security documents include without limitation value documents and value commercial goods.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm).

The present invention provides UV-Vis radiation curable security inks, preferably selected from the group consisting of UV-Vis radiation curable rotogravure security inks, UV-Vis radiation curable flexography security inks and UV-Vis radiation curable screen printing security inks and more preferably UV-Vis radiation curable screen printing security inks.

As known by those skilled in the art, the term rotogravure refers to a printing process which is described for example in *Handbook of Print Media*, Helmut Kipphan, Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

Flexography printing methods preferably use a unit with a chambered doctor blade, an anilox roller and plate cylinder. The anilox roller advantageously has small cells whose volume and/or density determines the ink or varnish application rate. The chambered doctor blade lies against the anilox roller, filling the cells and scraping off surplus ink or varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, $5^{th}$ Edition, pages 359-360.

Screen printing (also referred in the art as silkscreen printing) is a printing technique that typically uses a screen made of woven mesh to support an ink-blocking stencil. The attached stencil forms open areas of mesh that transfer ink as a sharp-edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily 150 m/min in web or 10'000 sheets/hour in a sheet-fed process.

Screen printing is further described for example in *The Printing Ink Manual*, R. H. Leach and R. J. Pierce, Springer Edition, 5$^{th}$ Edition, pages 58-62, in *Printing Technology*, J. M. Adams and P. A. Dolin, Delmar Thomson Learning, 5$^{th}$ Edition, pages 293-328 and in *Handbook of Print Media*, H. Kipphan, Springer, pages 409-422 and pages 498-499.

According to one embodiment, the UV-Vis radiation curable security ink, preferably the UV-Vis radiation curable screen printing security ink, described herein is a UV-Vis radiation cationically curable security inks. According to another embodiment, the UV-Vis radiation curable security ink, preferably the UV-Vis radiation curable screen printing security ink, described herein is a UV-Vis radiation hybrid curable security ink, i.e. an ink comprising one or more cationically curable compounds and one or more free radical curable compounds.

Cationically curable compounds are cured by cationic mechanisms consisting of the activation by UV-Vis light of one or more photoinitiators which liberate cationic species, such as acids, which in turn initiate the polymerization of the compound so as to form a cured binder. Radically curable inks or compositions are cured by free radical mechanisms consisting of the activation by UV-Vis light of one or more photoinitiators which liberate free radicals which in turn initiate the polymerization process. Optionally, one or more photosensitizers may also be present. Photosensitizers are activated by one or more of the wavelengths emitted by the UV-Vis light source and reach an excited state. The excited photosensitizer either transfer energy to the one or more photoinitiators (in free-radical polymerization) or an electron (in cationic polymerization). Either process in turn initiates the polymerization process. The light sources required to cure the UV-Vis radiation curable security inks described herein are selected from the group consisting of mercury lamps (preferably medium-pressure mercury lamps), UV-LED lamps and sequences thereof. Typical sequences include the use of one or more UV-LED lamps in a first step to partially cure the UV-Vis radiation composition and one or more medium-pressure mercury lamps in a second step. Mercury lamps advantageously emit on a wide range of wavelengths in the UV-A, UV-B and UV-C range. Accordingly, there is a large selection of photoinitiators or combinations of photoinitiator/photosensitizer having an absorption spectrum matching at least one of the emission band of the mercury lamp. UV-LED have a more limited range of wavelengths, such that only a limited selection of photoinitiators or combination of photoinitiator/photosensitizer is efficient enough at industrial printing speed. On the other hand, UV-LEDs are less costly, require less energy (in particular, they need much less demanding heat dissipation systems), are not prone to ozone formation and have a much longer lifespan.

The UV-Vis radiation curable security ink, preferably the UV-Vis radiation curable screen printing security ink, described herein comprises from about 75 wt-% to about 99 wt-% of an ink vehicle having a viscosity between about 200 and about 2000 mPas at 25° C. using a Brookfield viscometer (model "DV-I Prime", spindle S27 at 100 rpm for viscosities between 500 and 2500 mPas and spindle S21 at 100 rpm for viscosities equal to or lower than 500 mPas).

According to one embodiment, the ink vehicle described herein is a cationically curable ink vehicle (i.e. a fully cationically curable ink vehicle not comprising radically curable compounds) and comprises a1) from about 45 wt-% to about 75 wt-% of the one or more cycloaliphatic epoxides described herein and a2) from about 2 wt-% to about 15 wt-% of the one or more cationic photoinitiators, the weight percents being based on the total weight of the ink vehicle.

According to another embodiment, the ink vehicle described herein is a hybrid ink vehicle and thus comprises b1) from about 45 to about 75 wt-% of a mixture comprising the one or more cycloaliphatic epoxides described herein and the one or more radically curable compounds described herein and b2) from about 2 wt-% to about 15 wt-% of a mixture of the one or more cationic photoinitiators and the one or more free radical photoinitiators, the weight percents being based on the total weight of the ink vehicle.

The one or more cycloaliphatic epoxides described herein may be difunctional or polyfunctional. Preferably, the one or more cycloaliphatic epoxides described independently comprise at least one cyclohexane group, and at least two epoxide groups. Preferred cycloaliphatic epoxides comprise more than one cyclohexane epoxide groups and have the structural formula (I):

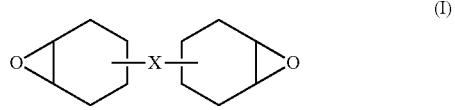

where X is selected from a single bond and a divalent group comprising one or more atoms.

According to one embodiment, X is a divalent hydrocarbon group being a straight- or branched-chain alkylene group comprising from one to eighteen carbon atoms, wherein examples of said straight- or branched-chain alkylene group include without limitation methylene group, methylmethylene group, dimethylmethylene group, ethylene group, propylene group, and trimethylene group.

According to one embodiment, X is a divalent alicyclic hydrocarbon group or cycloalkydene group such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

According to one embodiment, X is a divalent group comprising one or more oxygen-containing linkage groups being —CO—, —O—CO—O—, —COO— and —O—. According to one embodiment, preferred epoxy derivatives comprising more than one cyclohexane oxide groups and having the structural formula (I), wherein X is a divalent group comprising one or more oxygen-containing linkage groups being —CO—, —O—CO—O—, —COO—, —O—, have the structural formula (II), (III) or (IV):

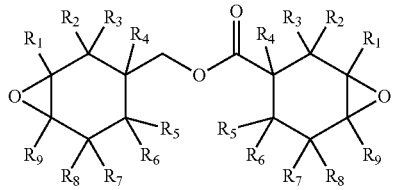

(II)

which corresponds to 3,4-epoxycyclohexylmethyl-3,4-epoxycyclohexane carboxylates wherein $R_1$-$R^9$ independently are hydrogen or linear or branched alkyl radicals containing from one to ten carbon atoms and preferably containing from one to three carbon atoms (such as methyl, ethyl, n-propyl, i-propyl, n-butyl, i-butyl, s-butyl, t-butyl, hexyl, octyl, and decyl), preferably cycloaliphatic epoxides having the structural formula (II) are 3,4-epoxycyclohexylmethyl-3,4-epoxycyclohexanecarboxylate, 3,4-epoxy-6-methyl-cyclohexylmethyl-3,4-epoxy-6-methylcyclohexanecarboxylate, 3,4-epoxy-2-methyl-cyclohexylmethyl-3,4-epoxy-2-methyl-cyclohexanecarboxylate, and 3,4-epoxy-4-methyl-cyclohexylmethyl-3,4-epoxy-4-methylcyclohexanecarboxylate;

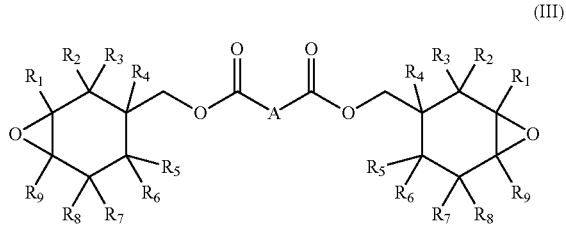

(III)

which corresponds to cycloaliphatic diepoxide esters of dicarboxylic acids, wherein $R_1$-$R^9$ independently are hydrogen or linear or branched alkyl radicals containing from one to ten carbon atoms and preferably containing from one to three carbon atoms (such as methyl, ethyl, n-propyl, isopropyl, butyl, hexyl, octyl, and decyl) and A is a valence bond or a linear or branched divalent hydrocarbon radical generally containing from one to ten carbon atoms and preferably containing from 3 to 8 carbon atoms, such as alkylene radicals (such as for example trimethylene, tetramethylene, hexamethylene and 2-ethylhexylene) and cycloaliphatic radicals (such as 1,4-cyclohexane, 1,3-cyclohexane and 1,2-cyclohexane); preferably cycloaliphatic diepoxide esters of dicarboxylic acids having the structural formula (III) are bis(3,4-epoxycyclohexylmethyl)adipate, bis(3,4-epoxy-6-methylcyclohexylmethyl)adipate, bis(3,4-epoxycyclohexylmethyl)oxalate, bis(3,4-epoxycyclohexylmethyl)pimelate, and bis(3,4-epoxycyclohexylmethyl) sebacate;

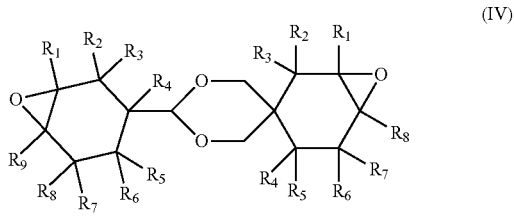

(IV)

wherein $R_1$-$R_9$ independently are hydrogen or linear or branched hydrocarbon radicals containing one to three carbon atoms; a preferred example of cycloaliphatic diepoxides having the structural formula (IV) is 2-(3,4-epoxycyclohexyl-5,5-spiro-3,4-epoxy)cyclohexane-meta-dioxane.

According to one embodiment, the one or more cycloaliphatic epoxides described herein have the structural formula (V) or (VI):

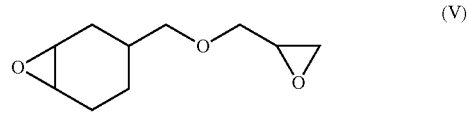

(V)

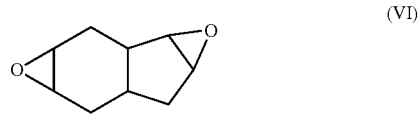

(VI)

The one or more cycloaliphatic epoxides described herein may be hydroxy modified or (meth)acrylate modified. Examples are commercially available under the name Cyclomer A400 (CAS: 64630-63-3) and Cyclomer M100 (CAS: 82428-30-6) by Daicel Corp., or TTA 15 and TTA16 by TetraChem/Jiangsu.

For embodiments wherein the ink vehicle described herein is a cationically curable ink vehicle (i.e. a fully cationically curable ink vehicle not comprising radically curable compounds), said ink vehicle described herein comprises from about 2 wt-% to about 15 wt-%, preferably from about 3 wt-% to about 12 wt-% and more preferably from about 4 wt-% to about 10 wt-%, of the one or more cationic photoinitiators (also referred in the art as photo-acid generators) being onium salts described herein. The onium salts described herein are preferably selected from the group consisting of azonium salts, oxonium salts, iodonium salts, sulfonium salts and mixtures thereof, more preferably selected from the group consisting of oxonium salts, iodonium salts, sulfonium salts and mixtures thereof, and still more preferably selected from the group consisting iodonium salts, sulfonium salts and mixtures thereof.

The one or more iodonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CF_3SO_3^-$, more preferably $SbF_6^-$ or $PF_6^-$ and wherein the cationic moiety is preferably an aromatic iodonium ion, more preferably a iodonium ion comprising two aryl groups, wherein the two aryl groups may be independently substituted by one or more alkyls groups (such as for example methyl, ethyl, isobutyl, tertbutyl, etc.) one or more alkoxy groups, one or more nitro groups, one or more halogen containing groups, one or more hydroxy groups or a combination thereof. Particularly suitable examples of iodonium salts for the present invention are commercially available under the name Omnicat 250 and 440 from IGM Resins and Speedcure 938 from Lambson.

The one or more sulfonium salts described herein have a cationic moiety and an anionic moiety, wherein the anionic moiety is preferably, $BF_4^-$, $B(C_6F_5)_4^-$, $PF_6^-$, $(PF_{6-m}(C_nF_{2n-1})_m)^-$ (where m is an integer from 1 to 5, and n is an integer from 1 to 4), $AsF_6^-$, $SbF_6^-$, $CF_3SO_3^-$, perfluoroalkyl sulfonate or pentafluorohydroxyantimonate, more preferably $SbF_6^-$ or $PF_6^-$ and wherein the cationic moiety is preferably an aromatic sulfonium ion, more preferably a sulfonium ion comprising two or more aryl groups, wherein the two or more aryl groups may be independently substituted by one or more alkyls groups (such as for example methyl, ethyl, isobutyl, tertbutyl, etc.) one or more alkoxy groups, one or more aryloxyl groups, one or more halogen containing groups, one or more hydroxy groups or a combination thereof.

Suitable examples of sulfonium ions comprising two or more aryl groups include without limitation triarylsulfonium ions, diphenyl[4-(phenylthio)phenyl]sulfonium ion, bis[4-(diphenylsulfonio)phenyl]sulfonium ion, triphenylsulfonium ions and tris[4-(4-acetylphenyl)sulfanylphenyl]sulfonium ion.

Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

For embodiments wherein the UV-Vis radiation curable security ink herein is a UV-Vis radiation hybrid curable security ink, the vehicle of said UV-Vis radiation hybrid curable security ink comprises the one or more cycloaliphatic epoxides described herein and the one or more radically curable compounds selected from the group consisting of tri(meth)acrylates, tetra(meth)acrylates and mixtures thereof described herein, wherein said one or more radically curable compounds described herein are preferably in an amount less than or equal to about 30 wt-%, the weight percents being based on the total weight of the ink vehicle.

The one or more radically curable tri(meth)acrylates described herein are preferably selected from the group consisting of trimethylolpropane triacrylates, trimethylolpropane trimethacrylates, alkoxylated (in particular ethoxylated or propoxylated) trimethylolpropane triacrylates, alkoxylated (in particular ethoxylated or propoxylated) trimethylolpropane trimethacrylates, alkoxylated (in particular ethoxylated or propoxylated) glycerol triacrylates, pentaerythritol triacrylates, alkoxylated (in particular ethoxylated or propoxylated) pentaerythritol triacrylates and mixtures thereof, preferably selected from the group consisting of trimethylolpropane triacrylates, alkoxylated (in particular ethoxylated or propoxylated) trimethylolpropane triacrylates, alkoxylated (in particular ethoxylated or propoxylated) glycerol triacrylates, pentaerythritol triacrylates and mixtures thereof.

The one or more radically curable tetra(meth)acrylates described herein are selected from the group consisting of ditrimethylolpropane tetraacrylates, pentaerythritol tetraacrylates, alkoxylated (in particular ethoxylated or propoxylated) pentaerythritol tetraacrylates and mixtures thereof, preferably selected from the group consisting of ditrimethylolpropane tetraacrylates, alkoxylated (in particular ethoxylated or propoxylated) pentaerythritol tetraacrylates and mixtures thereof.

The one or more free radical photoinitiators are preferably selected form the group consisting of hydroxyketones (e.g. alpha-hydroxyketones), alkoxyketones (e.g. alpha-alkoxyketones), acetophenones, benzophenones, ketosulfones, benzyl ketals, benzoin ethers, phosphine oxides, phenylglyoxylates, thioxanthones and mixtures thereof, more preferably selected form the group consisting of phosphine oxides, hydroxyketones, thioxanthones and mixtures thereof.

Suitable examples of alpha-hydroxyketones include without limitation (1-[4-(2-hydroxyethoxy)-phenyl]-2-hydroxy-2-methyl-1-propan-1-one); 1-hydroxycyclohexyl phenyl ketone; 2-hydroxy-2-methyl-1-phenylpropan-1-one; 2-hydroxy-2-methyl-1-(4-tert-butyl)phenylpropan-1-one; 2-hydroxy-1-[4-[[4-(2-hydroxy-2-methylpropanoyl)phenyl] methyl]phenyl]-2-methylpropan-1-one; 2-hydroxy-1-[4-[4-(2-hydroxy-2-methylpropanoyl)phenoxy]phenyl]-2-methylpropan-1-one; and oligo[2-hydroxy-2-methyl-1-[4-(1-methylvinyl)phenyl]propanone].

Suitable examples of acetophenones include without limitation 2,2-diethoxyacetophenone and 2-methoxy-2-phenylacetophenone.

Suitable examples of benzophenones include without limitation benzophenone; polymeric benzophenone derivatives; 2-methylbenzophenone; 3-methylbenzophenone; 4-methylbenzophenone; 2,4,6-trimethylbenzophenone; 3,3'-dimethyl-4-methoxybenzophenone; 4-phenylbenzophenone; 4-chlorobenzophenone; methyl-2-benzoylbenzoate; 4-(4-methylphenylthio)benzophenone; 4-hydroxybenzophenone laurate, and a mixture of 50% benzophenone and 50% 1-hydroxycyclohexyl phenyl ketone.

A suitable example of ketosulfone include without limitation 1-[4-(4-benzoylphenylsulfanyl)phenyl]-2-methyl-2-(4-methylphenylsulfonyl)propan-1-one.

A suitable example of benzyl ketals includes without limitation 2,2-dimethoxy-2-phenylacetophenone.

Suitable examples of benzoin ethers include without limitation 2-ethoxy-1,2-diphenylethanone; 2-isopropoxy-1,2-diphenylethanone; 2-isobutoxy-1,2-diphenylethanone; 2-butoxy-1,2-diphenylethanone; 2,2-dimethoxy-1,2-diphenylethanone; and 2,2-diethoxyacetophenone.

Suitable examples of phosphine oxides include without limitation 2,4,6-trimethylbenzoyldiphenylphosphine oxide; ethyl (2,4,6-trimethylbenzoyl)phenylphosphinate; phenylbis (2,4,6-trimethylbenzoyl)phosphine oxide; bis(2,6-dimethoxybenzoyl)-2,4,4-trimethylpentylphosphine oxide; substituted acyl-phosphine oxides; a mixture of diphenyl(2,4,6-trimethylbenzoyl)phosphine oxide and 2-hydroxy-2-methylpropiophenone, a mixture of phenylbis(2,4,6-trimethylbenzoyl)phosphine oxide and 2-hydroxy-2-methylpropiophenone; and a mixture of ethyl(2,4,6-trimethylbenzoyl)phenylphosphinate and 2-hydroxy-2-methylpropiophenone.

Suitable examples of thioxanthones include without limitation 2-methyl thioxanthone; 2,4-diethylthioxanthone; 2-isopropylthioxanthone; 1-chloro-4-propoxythioxanthone; and polymeric thioxanthone derivatives.

Suitable examples of phenylglyoxylates include without limitation methyl benzoylformate; 2-[2-oxo-2-phenyl-acetoxy-ethoxy]ethyl 2-oxo-2-phenylacetate; and a mixture of 2-[2-oxo-2-phenyl-acetoxy-ethoxy]ethyl 2-oxo-2-phenylacetate and oxy-phenyl-acetic acid 2-[2-hydroxy-ethoxy]-ethyl ester.

According to one embodiment mentioned herein, the UV-Vis radiation curable security ink described herein is a UV-Vis radiation hybrid curable security ink (i.e. the ink vehicle of said UV-Vis radiation curable security ink comprises the cycloaliphatic epoxides described herein, the one or more cationic photoinitiators being onium salts described herein, the one or more radically curable compounds described herein and the one or more free radical photoinitiators described herein), the total amount of the one or more cationic photoinitiators being onium salts and the one or more free radical photoinitiators is between about 2 wt-% and about 15 wt-%, preferably between about 3 wt-% and about 12 wt-% and more preferably between about 4 wt-% and about 10 wt-%, the weight percents being based on the total weight of the ink vehicle. Preferably, the one or more cationic photoinitiators being onium salts are present in an amount between about 1 wt-% and about 10 wt-% and the one or more free radical photoinitiators are present in an amount between about 1 wt-% and about 5 wt-%, the weight percents being based on the total weight of the ink vehicle; provided that the total amount of the one or more cationic photoinitiators being onium salts and the one or more free radical photoinitiators is between about 2 wt % and about 15 wt-%, preferably between about 3 wt-% and about 12 wt-% and more preferably between about 4 wt-% and about 10 wt-%, the weight percents being based on the total weight of the ink vehicle.

The ink vehicle of the UV-Vis radiation curable security ink described herein (the ink vehicle of the UV-Vis radiation cationically curable security ink as well as the ink vehicle of the UV-Vis radiation hybrid curable security ink) may further comprise c1) one or more vinyl ethers, or c2) one or more one or more oxetanes or c3) a combination of one or more vinyl ethers and or one or more one or more oxetanes.

According to one embodiment, the UV-Vis radiation curable security ink described herein (the ink vehicle of the UV-Vis radiation cationically curable security ink as well as the ink vehicle of the UV-Vis radiation hybrid curable security ink) may further comprise one or more vinyl ethers. For embodiments wherein the ink vehicle of the UV-Vis radiation curable security ink described herein comprises the one or more vinyl ethers described herein without the one or more oxetanes described herein, said one or more vinyl ethers are present in an amount less than about 20 wt-%, preferably in an amount larger than or equal to about 5.0 wt-% and less than or equal to about 15 wt-%, the weight percents being based on the total weight of the ink vehicle.

Vinyl ethers are known in the art to accelerate curing and reduce tackiness, thus limiting the risk of blocking and set-off when the printed sheets are put in stacks just after printing and curing. They also improve the physical and chemical resistance of the printed security element and enhance the flexibility of the printed and cured ink layer, which may be advantageous when the security ink of the invention is printed on plastic or polymer substrates. Vinyl ethers also help reducing the viscosity of the ink while strongly co-polymerizing with the ink vehicle.

Examples of preferred vinyl ethers include methyl vinyl ether, ethyl vinyl ether, n-propyl vinyl ether, n-butyl vinyl ether, isobutyl vinyl ether, ethylhexyl vinyl ether, octadecyl vinyl ether, dodecyl vinyl ether, isopropyl vinyl ether, tert-butyl vinyl ether, tert-amyl vinyl ether, cyclohexyl vinyl ether, cyclohexanedimethanol monovinyl ether, cyclohexanedimethanol divinyl ether, 4-(vinyloxy methyl)cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol divinyl ether, ethylene glycol monovinyl ether, 1, 4-butanediol divinyl ether, 1,6-hexanediol divinyl ether, 4-(vinyloxy) butyl benzoate, bis[4-(vinyl oxy)butyl]adipate, bis[4-(vinyloxymethyl)cyclohexylmethyl]glutarate, 4-(vinyloxy)butyl succinate, bis[4-(vinyloxymethyl)cyclohexylmethyl]glutarate, 4-(vinyloxy)butyl stearate, trimethylolpropane trivinyl ether, propenyl ether of propylene carbonate, diethylene glycol monovinyl ether, diethylene glycol divinyl ether, ethylene glycol butylvinyl ether, dipropylene glycol divinyl ether, triethylene glycol divinyl ether, triethylene glycol methyl vinyl ether, triethylene glycol monobutyl vinylether, tetraethylene glycol divinyl ether, poly(tetrahydrofuran) divinyl ether, polyethyleneglycol-520 methyl vinyl ether, pluriol-E200 divinyl ether, tris[4-(vinyloxy)butyl]trimellitate, 1,4-bis(2-vinyloxyethoxy)benzene, 2,2-bis(4-vinyloxyethoxyphenyl)propane, bis[4-(vinyloxy) methyl]cyclohexyl]methyl] terephthalate, bis[4-(vinyloxy) methyl]cyclohexyl]methyl]isophthalate. Suitable vinyl ethers are commercially sold by BASF under the designation EVE, IBVE, DDVE, ODVE, BDDVE, DVE-2, DVE-3, CHVE, CHDM-di, HBVE. The one or more vinyl ethers described herein may be hydroxy modified or (meth)acrylate modified (for example: VEEA, 2-(2-Vinyloxyethoxy)ethyl acrylate from Nippon Shokubai (CAS: 86273-46-3)).

According to another embodiment, the ink vehicle of the UV-Vis radiation curable security ink described herein (the ink vehicle of the UV-Vis radiation cationically curable security ink as well as the ink vehicle of the UV-Vis radiation hybrid curable security ink) comprises the one or more oxetanes described herein. For embodiments wherein the ink vehicle of the UV-Vis radiation curable security ink described herein comprises the one or more oxetanes described herein without the one or more vinyl ethers described herein, said one or more oxetanes are present in an amount less than or equal to about 30 wt-%, preferably larger than or equal to about 5 wt-% and less than or equal to about 25 wt-%, the weight percents being based on the total weight of the ink vehicle.

Oxetane compounds are known in the art to accelerate curing and reduce tackiness, thus limiting the risk of blocking and set-off when the printed sheets are put in stacks just after printing and curing. They also help reducing the viscosity of the ink while strongly co-polymerizing with the ink vehicle.

Preferred examples of oxetanes include trimethylene oxide, 3,3-dimethyloxetane, trimethylolpropane oxetane, 3-ethyl-3-hydroxymethyl oxetane, 3-ethyl-3-[(2-ethylhexyloxy) methyl]oxetane, 3,3-dicyclomethyl oxetane, 3-ethyl-3-phenoxymethyl oxetane, bis([1-ethyl(3-oxetanyl)]methyl) ether, 1,4-bis [3-ethyl-3-oxetanyl methoxy)methyl]benzene, 3,3-dimethyl-2(p-methoxy-phenyl)-oxetane, 3-ethyl-[(triethoxysilyl propoxy)methyl]oxetane, 4,4-Bis(3-ethyl-3-oxetanyl)methoxymethyl]biphenyl and 3,3-dimethyl-2(p-methoxy-phenyl) oxetane. The one or more oxetanes described herein may be hydroxy modified or (meth)acrylate modified (for example: UVi-Cure S170 CAS from Lambson (CAS: 37674-57-0)).

According to another embodiment, the ink vehicle of the UV-Vis radiation curable security ink described herein (the ink vehicle of the UV-Vis radiation cationically curable security ink as well as the ink vehicle of the UV-Vis radiation hybrid curable security ink) comprises the one or more vinyl ethers described herein and the one or more oxetanes described herein. For embodiments wherein the ink vehicle of the UV-Vis radiation curable security ink described herein comprises the combination of the one or more vinyl ethers described and the one or more oxetanes described herein, said combination is present in an amount less than or equal to about 15 wt-%, preferably larger than or equal to about 10 wt-% and less than or equal to about 15 wt-%, the weight percents being based on the total weight of the ink vehicle.

A well-chosen balance of the one or more vinyl ethers described herein and the one or more oxetanes described herein, within the specified range, help optimizing the desired properties of the security element made of the security ink of the invention, in particular easy processability (optimal viscosity, fast curing, no set-off, no blocking) and strong chemical and physical resistance. Furthermore, since vinyl ethers and oxetanes are usually cheaper than cycloaliphatic epoxide compounds, they also help enhancing cost effectiveness.

The ink vehicle of the UV-Vis radiation curable security ink described herein (the ink vehicle of the UV-Vis radiation cationically curable security ink as well as the ink vehicle of the UV-Vis radiation hybrid curable security ink) may further comprise one or more polyhydroxy compounds, wherein said one or more polyhydroxy compounds are preferably present in an amount less than or equal to about 25 wt-%, more preferably in an amount between about 15 wt-% and about 20 wt-%, the weight percents being based on the total weight of the ink vehicle.

Polyhydroxy compounds are known in the art to improve adhesion to substrates known to exhibit poor adhesion properties, such as plastic or polymer substrates that become increasingly popular in the field of security documents, in particular banknotes.

The one or more polyhydroxy compounds described herein preferably comprise more than two hydroxyl groups and may be linear, branched or hyperbranched (also referred in the art as dendritic). Preferably, the one or more polyhydroxy compounds described herein are trifunctional, tetrafunctional compounds, hexafunctional compounds or multifunctional compounds.

The one or more polyhydroxy compounds described herein are preferably selected from the group consisting of polyhydroxy derivatives of aliphatic or aromatic polyethers, polyhydroxy derivatives of polyesters, polyhydroxy derivatives of polycarbonates, glycerol, trimethylolpropane, di-trimethylolpropane, pentaerytritol, dipentaerytritol and mixtures thereof.

The one or more polyhydroxy compounds described herein may be at least partially alkoxylated. The one or more polyhydroxy compounds described herein may therefore have alkoxylated units, preferably ethoxylated and/or propoxylated units.

According to one embodiment, the one or more polyhydroxy compounds described herein are polyhydroxy derivatives of aliphatic or aromatic polyethers. Example of polyhydroxy derivatives of aliphatic or aromatic polyethers include polyoxyalkylene polyols and polyalkoxylated polyols such as for example polyethylene glycol and polypropylene glycol.

According to a preferred embodiment, the one or more polyhydroxy compounds described herein are selected from the group consisting of trifunctional compounds, preferably glycerols and trimethylolpropanes, tetrafunctional compounds, preferably di-trimethylolpropanes and pentaerytritols, hexafunctional compounds, preferably dipentaerytritols, and mixtures thereof, wherein said compounds, preferably said trimethylolpropanes, pentaerytritols and dipentaerytritols, may be alkoxylated (ethoxylated and/or propoxylated).

Suitable examples of alkoxylated polyhydroxy compounds are sold by Perstorp under the designation Polyol 3165, 3380, 3610, 3611, 3940, 3990, R3215, R3430, R3530, R3600, 4290, 4360, 4525, 4640, 4800, R4630, R4631, R4650 and R6405, wherein the first number indicates the number of hydroxyl groups per molecule and the three following numbers indicate the hydroxyl number.

According to an embodiment, the one or more polyhydroxy compounds described herein are polyydroxy derivatives of polyesters such as polycaprolactone diols, triols and tetraols. Such compounds are for example sold as PLACCEL 200 Series, PLACCEL 300 Series and PLACCEL 400 Series by Daicel Corp.

According to a preferred embodiment, the one or more polyhydroxy compounds described herein are hyperbranched polyhydroxy derivatives of polyesters. As used herein, the term "hyperbranched polymers" are also known as dendritic polymers, highly branched polymers, dendritic macromolecules or arborescent polymers, which are three dimensional highly branched molecules that have a treelike structure and comprise one or more branching comonomer units. The branching comonomer units comprise branching layers, one or more spacing layers, and/or a layer of chain terminating molecules as well as an optional nucleus, also known as core. Continued replication of the branching layers yields increased branch multiplicity, branch density, and an increased number of terminal functional groups, when compared to other molecules. As described for example in U.S. Pat. No. 5,418,301, hyperbranched polyhydroxy derivatives of polyesters are obtained by the controlled esterification of a polyhydroxy compound (such as for example trimethylolpropane, pentaerythritol, etc.) serving as a central nucleating molecule, with an appropriate number of equivalents of dimethylolpropionic acid, in one or several subsequent steps. Suitable examples of polyhydroxy compounds being dendritic polyhydroxy derivatives of polyesters are sold by Perstorp under the designation Boltorn™ H20, Boltorn™ H2004, Boltorn™ H311, Boltorn™ P1000 and Boltorn™ P500.

The one or more polyhydroxy compounds described herein preferably have a hydroxyl number between 100 and 1000 mg KOH/g.

The ink vehicle of the UV-Vis radiation curable security ink described herein (the ink vehicle of the UV-Vis radiation cationically curable security ink as well as the ink vehicle of the UV-Vis radiation hybrid curable security ink) may further comprise one or more fillers or extenders preferably selected from the group consisting of carbon fibers, talcs, mica (muscovite), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulfides, wood flours, quartz flours, natural fibers, synthetic fibers and combinations thereof. When present, the one or more fillers or extenders are preferably present in an amount from about 0.1 wt-% to about 20 wt-%, more preferably in an amount from about 0.1 wt-% to about 10 wt-%, the weight percents being based on the total weight of the ink vehicle.

The ink vehicle of the UV-Vis radiation curable security ink described herein (the ink vehicle of the UV-Vis radiation cationically curable security ink as well as the ink vehicle of the UV-Vis radiation hybrid curable security ink) may further comprise one or more photosensitizers in conjunction with the one or more photoinitiators described herein in order to achieve efficient curing. Suitable examples of photosensitizers are known to those skilled in the art (e.g. in Industrial Photoinitiators, W. A. Green, CRC Press, 2010, Table 8.1 p 0.170). Preferred photosensitizers are those that are able to achieve efficient and fast curing with UV-LED light sources, such as thioxanthone derivatives, anthracene derivatives (such as 9,10-diethoxyanthracene sold as Anthracure UVS-1101 and 9,10-dibutyloxyanthracene sold as Anthracure UVS-1331, both sold by Kawasaki Kasei Chemicals Ltd) and titanocene derivatives (such as Irgacure 784 sold by BASF). Particularly preferred are thioxanthone derivatives, including without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures thereof. Alternatively, thioxanthone photosensitizers may be used in an oligomeric or polymeric form (such as Omnipol TX sold by IGM Resins, Genopol* TX-2 sold by Rahn, or Speedcure 7010 sold by Lambson). When present, the one or more photosensitizers are preferably present in an amount from about 0.1 wt-% to about 10 wt-%, more preferably about 0.1 wt-% to about 5 wt-% and still more preferably about 0.2 wt-% to about 1 wt-%, the weight percents being based on the total weight of the ink vehicle.

The ink vehicle of the UV-Vis radiation curable security ink described herein (the ink vehicle of the UV-Vis radiation cationically curable security ink as well as the ink vehicle of the UV-Vis radiation hybrid curable security ink) may further comprise one or more solvents to fine-tune the viscosity of the UV-Vis radiation curable security ink described herein. Preferred solvents are polar aprotic solvents exhibiting a high boiling point such as carbonates. Preferred carbonates are alkylene carbonates (e.g. ethylene carbonates, propylene carbonates and butylene carbonates). Particularly preferred are propylene carbonates, which have a high boiling point and a favorable ecotoxicity profile. Preferably, the amount of the one or more solvents in the ink vehicle is less than about 5 wt-% and more preferably less than about 2 wt-%, the weight percents being based on the total weight of the ink vehicle.

For embodiments wherein the ink vehicle of the UV-Vis radiation curable security ink described herein is a hybrid curable ink vehicle, said ink vehicle may further comprise one or more reactive diluents being radically curable monomers selected from mono(meth)acrylates, di(meth)acrylates and mixtures thereof.

The ink vehicle of the UV-Vis radiation curable security ink described herein (the ink vehicle of the UV-Vis radiation cationically curable security ink, as well as the ink vehicle of the UV-Vis radiation hybrid curable security ink) may further comprise one or more marker substances and/or taggants including forensic markers and/or forensic taggants and/or one or more machine readable materials selected from the group consisting of magnetic materials known in the art, luminescent materials and electroluminescent materials known in the art, electrically conductive materials known in the art, infrared-absorbing materials known in the art and (surface enhanced) Raman active compounds known in the art. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication. The one or more machine readable materials are to be chosen so that their detection in the security feature made with the UV-Vis radiation curable security ink claimed and described herein is not impaired by the pigments comprising a flake-shaped non-metallic or metallic substrate contained by said security feature. It is within the common general knowledge of the person skilled in the art of inks formulation to select the machine readable materials to be used in a security ink taking into account the known characteristics of the pigments comprising a flake-shaped non-metallic or metallic substrate contained by said ink. A UV-Vis radiation curable security ink as claimed and described herein, preferably a UV-Vis cationically radiation curable security ink as claimed and described herein, wherein the pigments comprise a flake-shaped non-metallic substrate and the ink vehicle comprises one or more machine readable materials selected from the group consisting of magnetic materials known in the art, luminescent materials and electroluminescent materials known in the art, electrically conductive materials known in the art, infrared-absorbing materials known in the art and (surface enhanced) Raman active compounds known in the art, preferably selected from the group consisting of magnetic materials known in the art and infrared-absorbing materials known in the art, and more preferably selected from the group consisting of magnetic materials known in the art, is preferred. Also preferred is a UV-Vis radiation curable security ink as claimed and described herein, preferably a UV-Vis cationically radiation curable security ink as claimed and described herein, wherein the pigments comprise a flake-shaped metallic substrate and the ink vehicle comprises one or more machine readable materials selected from the group consisting of magnetic materials known in the art, luminescent materials and electroluminescent materials known in the art, electrically conductive materials known in the art and (surface enhanced) Raman active compounds known in the art, preferably selected from the group consisting of magnetic materials known in the art. Non-limiting examples of infrared-absorbing materials that are suitable for a UV-Vis radiation curable security ink as claimed and described herein containing pigments with a flake-shaped non-metallic substrate are described in WO 2007/060133 and WO 2019/219250. Non-limiting examples of magnetic materials that are suitable for a UV-Vis radiation curable security ink as claimed and described herein include the core-shell magnetic particles described in WO 2008/148201, WO 2010/115986, WO 2017/129666 and WO 2016/005158.

The ink vehicle of the UV-Vis radiation curable security ink described herein (the ink vehicle of the UV-Vis radiation cationically curable security ink as well as the ink vehicle of the UV-Vis radiation hybrid curable security ink) may further comprise one or more coloring ingredients selected from the group consisting of organic pigment particles, inorganic pigment particles, organic dyes and mixtures thereof; and/or one or more additives. The latter include without limitation compounds and materials which are used for adjusting physical, rheological and chemical parameters of the UV-Vis radiation cationically curable security ink, preferably the UV-Vis radiation cationically curable screen printing security ink, described herein such as the consistency (e.g. anti-settling agents and plasticizers), the foaming properties (e.g. antifoaming agents and deaerators), the lubricating properties (waxes), etc. Additives described herein may be present in the ink vehicle or the UV-Vis radiation curable security ink, preferably the UV-Vis radiation curable screen printing security ink, described herein in amounts and in forms known in the art, including in the form of so-called nano-materials where at least one of the dimensions of the additives is in the range of 1 to 1000 nm.

The UV-Vis radiation curable security inks, preferably the UV-Vis radically curable screen printing security inks, described herein comprise from about 1 wt-% to about 25 wt-%, preferably from about 5 wt-% to about 20 wt-% and more preferably from about 10 wt-% to about 20 wt-%, of pigments comprising the flake-shaped non-metallic or metallic substrate described herein, wherein said flake-shaped non-metallic or metallic substrate is at least partially coated with the one or more at least partial coating layers described herein and comprises the at least partial surface treatment layer facing the environment and made of the one or more surface modifiers described herein. By "facing the environment", it is meant that said surface treatment layer is the topmost layer of the pigments and acts as an outer layer. The at least partial surface treatment layer is in direct contact with the top layer of the one or more at least partial coating layers described herein.

The flake-shaped non-metallic or metallic substrate of the pigments described herein comprises one or more at least partial coatings independently made of one or more metal oxides, one or more metal oxide hydrates, one or more metal suboxides or mixtures of these materials; in other words, the non-metallic or metallic flakes described herein are at least partially coated with one or more layers made of one or more metal oxides, one or more metal oxide hydrates, one or more metal suboxides or mixtures of these materials. The thickness of the metal oxide, metal oxide hydrate, metal suboxide or the mixture thereof is usually 5 to 1000 nm, preferably 10 to 800 nm, in particular 20 to 600 nm.

As known by the man skilled in the art, the one or more at least partial coatings may be applied to the flake-shaped non-metallic or metallic substrate by precipitation methods, wet-chemical methods, sol-gel methods physical vapor deposition (PVD) processes or chemical vapor deposition (CVD) processes, wherein said methods are chosen as a function of the substrate materials and the coating materials. Alternatively, the one or more at least partial coatings made of metal oxides and/or oxide hydrates may be obtained on flake-shaped metallic substrates by chemical oxidation of the metal surface (e.g. with permanganate or other strong oxidation agents) or by heating the flake-shaped metallic pigment in air or in a controlled atmosphere (e.g. enriched in oxygen and/or in water vapor) at elevated temperature during a given amount of time, the time, temperature and atmosphere composition depending on the metal and on the desired thickness of the at least partial coatings. For example, the flake-shaped metallic pigment may be baked in an oven at 300° C. in dry air for 30 minutes in order to get the at least partial coatings made of metal oxide and/or metal hydrate The size of the pigments, expressed by the d50 value, described herein used is preferably in the range from about 1 μm to about 100 μm (microns), preferably from about 5 μm to about 50 μm (microns). The thickness of the pigments is usually between about 0.1 μm and about 5 μm (microns), preferably between about 0.2 μm and about 4 μm (microns).

According to one embodiment, the flake-shaped non-metallic substrate of the pigments described herein is preferably made of one or more materials selected from the group consisting of natural micas, synthetic micas, talcs, graphites, borosilicates (e.g. glasses) and kaolins, more preferably selected from the group consisting of natural micas, synthetic micas and glasses and still more preferably selected from the group consisting of natural micas and synthetic micas.

The flake-shaped non-metallic substrate described herein comprises one or more at least partial coatings independently made of one or more metal oxides, one or more metal oxide hydrates, one or more metal suboxides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide, titanium oxide and any mixtures thereof. Preferably, the non-metallic substrate described herein consists of a non-metallic substrate, preferably made of a natural mica or synthetic mica, comprising one or more at least partial coatings independently made of one or more metal oxides selected from the group consisting of titanium dioxides, tin oxides, iron oxide, chromium oxide and mixtures thereof. Particularly preferred flake-shaped non-metallic substrates for the pigments described herein consist of natural micas or synthetic micas comprising one or more at least partial coatings independently made of titanium dioxide (i.e. flake-shaped mica substrate+$TiO_2$) or a mixture comprising titanium dioxide as well as natural or synthetic micas comprising more than one at least partial coatings, wherein one of said one or more at least partial coatings is made of titanium dioxide and another one of said one or more at least partial coatings is made of tin oxide (i.e. flake-shaped mica substrate+$SnO_2$+$TiO_2$ or flake-shaped mica substrate+$TiO_2$+$SnO_2$).

According to one embodiment, the flake-shaped metallic substrate of the pigments described herein consists of a single layer made of one or more metals preferably selected from the group consisting of aluminum, copper, zinc, tin, brass, iron, titanium, chromium, nickel, silver, gold, steel, alloys thereof and mixtures thereof preferably selected from the group consisting of aluminum, iron and brass. The flake-shaped metallic substrate described herein comprises one or more at least partial coatings independently made of one or more metal oxides, one or more metal oxide hydrates, one or more metal suboxides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide and titanium oxide.

According to one embodiment, the flake-shaped metallic substrate of the pigments described herein consists of a multilayer comprising one or more metallic layers selected from the metals described herein and optionally one or more non-metallic layers.

According to one preferred embodiment, the flake-shaped metallic substrate of the pigments described herein consists of a multilayer comprising one or more metallic layers and optionally one or more non-metallic layers being thin film interference multilayers comprising a Fabry-Perot reflector/dielectric/absorber multilayer structures such as those disclosed in U.S. Pat. Nos. 4,705,300; 4,705,356; 4,721,271; 5,084,351; 5,214,530; 5,281,480; 5,383,995; 5,569,535, 5,571,624 and in the thereto related documents. Preferably, the multi layers comprising one or more metallic layers described herein are thin film interference pigments comprising a Fabry-Perot absorber/dielectric/reflector/dielectric/absorber multilayer structure, wherein the absorber layers are partially transmitting and partially reflecting, the dielectric layers are transmitting and the reflective layer is reflecting the incoming light. Preferably, the reflector layer is selected from the group consisting of metals, metal alloys and combinations thereof, preferably selected from the group consisting of reflective metals, reflective metal alloys and combinations thereof and more preferably selected from the group consisting of aluminum, chromium, nickel, and mixtures thereof and still more preferably aluminum. Preferably, the dielectric layers are independently selected from the group consisting of magnesium fluoride, silicon dioxide and mixtures thereof and more preferably magnesium fluoride. Preferably, the absorber layers are independently selected from the group consisting of chromium, nickel, metallic alloys and mixtures thereof and more preferably chromium. Particularly preferred thin film interference multilayers comprise a Fabry-Perot absorber/dielectric/reflector/dielectric/absorber multilayer structure comprising a $Cr/MgF_2/Al/MgF_2/Cr$ multilayer structure. The flake-shaped metallic substrate of the pigments described herein consisting of a thin film interference multilayer further comprises an at least partial coating made of one or more metal oxides, one or more metal oxide hydrates, one or more metal suboxides, one or more metal fluorides, or mixtures of these materials, preferably one or more metal oxides and/or one or more metal oxide hydrates, more preferably comprising one or more metal oxides. Preferred metal oxides are aluminum oxides, silicon oxide, iron oxides, tin oxide, cerium oxide, zinc oxide, zirconium oxide, chromium oxide and titanium oxide, preferably chromium oxide and mixtures thereof.

The flake-shaped non-metallic or metallic substrate further comprises the at least partial surface treatment layer described herein, wherein said surface treatment layer faces the environment and is in direct contact with the top layer of the one or more at least partial coating layers. In other words, the at least partial surface treatment layer described herein is present on the top layer coating of the one or more at least partial coatings. The at least partial surface treatment layer described herein is made of one or more surface modifiers selected from perfluoropolyethers, said perfluoropolyethers being functionalized with one or more phosphor (P) containing compounds or one or more silicon (Si) containing compounds. The functionalized perfluoropolyethers described herein are preferably functionalized with one or more phosphate containing groups, one or more silane containing groups or one or more siloxane containing groups.

The surface modification can take place in a variety of ways. For example, the one or more surface modifiers described herein may be dissolved in an organic solvent and/or water and are subsequently applied to the flake-shaped non-metallic or metallic substrates comprising the one or more at least partial coating layers described herein by mixing and subsequently the so-obtained pigments are dried. Alternatively, the surface treatment with the one or more surface modifiers may take place immediately after the flake-shaped non-metallic or metallic substrate has been at least partially coated with the one or more at least partial coating layers described herein in a one-pot process. An optional calcination step may be carried out on the flake-shaped non-metallic or metallic substrates comprising the one or more at least partial coating layers described herein prior to the surface treatment.

The one or more surface modifiers described herein preferably have a weight average molecular weight below about 2000 g/mol eq PS as measured according to the method described herein.

According to one embodiment, the one or more surface modifiers described herein are perfluoropolyethers (i.e. comprising the structure $—CH_2O—(CF_2)_m—(CF_2—CF_2—O)_n—CF_2—$) being functionalized with one or more phosphor (P) containing groups or one or more silicon (Si) containing groups, in particular perfluoropolyethers having one or more phosphate groups or perfluoropolyether compounds having one or more silane.

According to one embodiment, the one or more surface modifiers described herein consist of (perfluoropolyethers being mono- or bifunctionalized with one or more phosphate groups, preferably phosphoric or phosphonic ester groups, more preferably alkoxylated perfluoropolyether compounds derivatives having phosphate groups, preferably phosphoric or phosphonic ester groups. Preferably, the one or more surface modifiers described herein are (perfluoropolyethers of the following formula (VII):

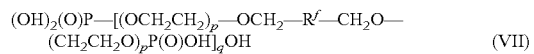

wherein p=1-2, q=1-4 and $R^f$ is $CH_2O—(CF_2)_m—(CF_2—CF_2—O)_n—CF_2$. A particularly suitable example of surface modifiers for the present invention is commercially available under the name Fluorolink® P54 from Solvay.

According to another embodiment, the one or more surface modifiers described herein are perfluoropolyethers being functionalized with one or more silane groups, preferably alkoxylated silane groups. Preferably, the one or more surface modifiers described herein consist of perfluoropolyethers of the following formula (VIII):

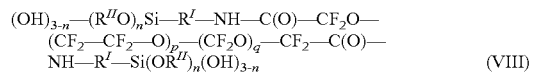

wherein $R^I$ is alkylene from 1 to 10 carbon atoms, preferably from 1 to 5 carbon atoms, still more preferably from 2 to 4 carbon atoms; $R^{II}$ is a linear or branched alkyl group from 1 to 4 carbon atoms, preferably from 1 to 3 carbon atoms; n is an integer from 0 to 3, preferably 3; p and q are numbers such that the q/p ratio is between 0.2 and 4; and p is different from zero. Preferably, the one or more surface modifiers described herein are perfluoropolyethers functionalized with silane groups of the following formula (IX):

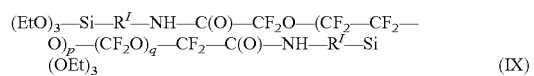

wherein $R^I$ is alkylene from 1 to 10 carbon atoms, preferably from 1 to 5 carbon atoms, still more preferably from 2 to 4 carbon atoms and p and q are numbers such that the q/p ratio is between 0.2 and 4; and p is different from zero. A particularly suitable example of surface modifiers for the present invention is commercially available under the name Fluorolink® S10 from Solvay with the following formula (X):

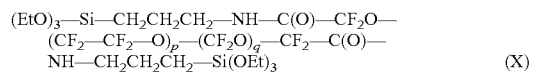

wherein p=2-6 and q=2-4.

The present invention further provides methods for producing the UV-Vis radiation curable inks, preferably the UV-Vis radiation curable screen printing inks, described herein and inks obtained therefrom. The UV-Vis radiation curable inks, preferably the UV-Vis radiation curable screen printing inks, described herein may be prepared by dispersing or mixing the components of the ink vehicle described herein, i.e. the one or more cycloaliphatic epoxides, the one or more radically curable compounds when present, the cationic photoinitiators being onium salts, the one or more free radical photoinitiators when present and the optional additives described herein, with the pigments described herein, wherein all of said compounds may be dispersed or mixed in a single step or wherein the ink vehicle is first prepared and then the pigments described herein are added and the so-obtain mixture is dispersed or mixed. The one or more photoinitiators described herein may be added either during the dispersing or mixing step of all other ingredients or may be added at a later stage, i.e. after the formation of the inks.

The UV-Vis radiation curable inks, preferably the UV-Vis radiation curable screen printing inks, described herein are applied on the substrate described herein for producing a security feature by a printing process preferably selected from the group consisting of rotogravure processes, flexography processes and screen printing processes, more preferably by a screen printing process.

The present invention further provides methods for producing the security features described herein and security features obtained thereof. The method comprising a step a) of printing, preferably by a printing process selected from the group consisting of rotogravure processes, flexography processes and screen printing processes, more preferably selected from the group consisting of screen printing processes, the UV-Vis radiation curable security ink described herein onto the substrate described herein and a step b) of curing the UV-Vis radiation curable security ink in the presence of UV-Vis radiation is carried out so as to form one or more security features such as those described herein. Preferably, the method described herein comprising a step a) of printing by a screen printing process the UV-Vis radiation curable screen printing security ink described herein onto the substrate described herein and a step b) of curing the UV-Vis radiation curable screen printing security ink in the presence of UV-Vis radiation is carried out so as to form one or more security features such as those described herein. Preferably, the curing step b) described herein is carried out with one or more light sources selected from the group consisting of mercury lamps (preferably medium-pressure mercury lamps), UV-LED lamps and sequences thereof. On the contrary to medium-pressure mercury lamps that have emission bands in the UV-A, UV-B and UV-C regions of the electromagnetic spectrum, UV-LED lamps emit radiation in the UV-A region (365-405 nm). As mentioned herein, the typical sequences include the use of one or more UV-LED lamps in a first step to partially cure the UV-Vis radiation composition and one or more medium-pressure mercury lamps in a second step. Mercury lamps advantageously emit on a wide range of wavelengths in the UV-A, UV-B and UV-C range.

The present invention further provides security features made of the UV-Vis radiation curable security inks, preferably the UV-Vis radiation curable screen printing security inks, described herein on the substrate described herein.

The substrates described herein are preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum, chromium, copper, gold, silver, alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc.

When the UV-Vis radiation curing security inks described herein are printed on substrates made of plastics or polymers, in particular when they are printed on a transparent or translucent window area of said substrate, they preferably contain the one or more polyhydroxy compounds described herein in order to increase the adhesion of the UV-Vis radiation curing security ink to said substrate and the one or more vinyl ether compounds described herein to improve the flexibility of the printed and cured layer. In this case, the one or more vinyl ether compounds are present in an amount less than about 20 wt-%, preferably in an amount larger than or equal to about 5.0 wt-% and less than or equal to about 15 wt-% and the one or more poly-hydroxy compounds are present in an amount less than or equal to 25 wt-%, more preferably in an amount between about 15 wt-% and about 20 wt-%, the weight percents being based on the total weight of the ink vehicle.

The present invention further provides security documents comprising the substrate described herein and the security feature described herein or security documents comprising more than one of the security features described herein. Security documents include without limitation value documents and value commercial goods. Typical examples of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like. The term "value commercial good" refers to packaging material, in particular for pharmaceutical, cosmetics, electronics or food industry that may be protected against counterfeiting and/or illegal reproduction in order to warrant the content of the packaging like for instance genuine drugs. Example of these packaging material include without limitation labels such as authentication brand labels, tamper evidence labels and seals. Preferably, the security document described herein is selected from the group consisting of banknotes, identity documents, right-conferring documents, driving licenses, credit cards, access cards, transportation titles, vouchers and secured product labels. Alternatively, the security features described herein may be produced onto an auxiliary substrate such as for example a security thread, security stripe, a foil, a decal, a window or a label and consequently transferred to a security document in a separate step.

With the aim of further increasing the security level and the resistance against counterfeiting and illegal reproduction of security documents, the substrate described herein may contain printed, coated, or laser-marked or laser-perforated indicia, watermarks, security threads, fibers, planchettes, luminescent compounds, windows, foils, decals, primers and combinations of two or more thereof.

With the aim of increasing the durability through soiling or chemical resistance and cleanliness and thus the circulation lifetime of security documents or with the aim of modifying their aesthetical appearance (e.g. optical gloss), one or more protective layers may be applied on top of the security features or security document described herein. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable. More preferably UV-Vis radiation curable compositions.

The security features described herein may be provided directly on a substrate on which it shall remain permanently (such as for banknote applications). Alternatively, a security feature may also be provided on a temporary substrate for production purposes, from which the security feature is subsequently removed. Thereafter, after hardening/curing of the UV-Vis radiation curable security inks, preferably the UV-Vis radiation curable screen printing security inks, described herein for the production of the security feature, the temporary substrate may be removed from the security feature.

Alternatively, in another embodiment an adhesive layer may be present on the security feature or may be present on the substrate comprising said security feature, said adhesive layer being on the side of the substrate opposite to the side where the security feature is provided or on the same side as the security feature and on top of the security feature. Therefore, an adhesive layer may be applied to the security feature or to the substrate, said adhesive layer being applied after the curing step has been completed. Such an article may be attached to all kinds of documents or other articles or items without printing or other processes involving machinery and rather high effort. Alternatively, the substrate described herein comprising the security feature described herein may be in the form of a transfer foil, which can be applied to a document or to an article in a separate transfer step. For this purpose, the substrate is provided with a release coating, on which the security feature is produced as described herein. One or more adhesive layers may be applied over the so produced security feature.

Also described herein are substrates, security documents, decorative elements and objects comprising more than one, i.e. two, three, four, etc. security feature described herein. Also described herein are articles, in particular security documents, decorative elements or objects, comprising the security feature described herein.

As mentioned hereabove, the security features described herein may be used for protecting and authenticating a security document or decorative elements.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

The skilled person can envisage several modifications to the specific embodiments described above without departing from the spirit of the present invention. Such modifications are encompassed within the present invention.

Further, all documents referred to throughout this specification are hereby incorporated by reference in their entirety as set forth in full herein.

EXAMPLES

The present invention is now described in more details with reference to non-limiting examples. The Examples below provide more details for the preparation and properties of UV-Vis radiation curable screen printing security inks and security features obtained thereof.

Two series of screen printing security inks have been prepared and applied on a substrate:

E1-E4 have been prepared with different flakes, wherein the surface of said flakes has been independently treated with different compounds so as to provide a surface treatment layer on said flakes. Table 1 provides a description of the flakes. Table 3A-1 provides a description of the solvent-based ink vehicle S0 used to prepare comparative solvent-based screen printing security inks (C1, C7 and C9) according to the prior art such as for example U.S. Pat. No. 8,147,932. Table 3A-2 provides a description of a UV-Vis radiation curable ink vehicle used to prepare UV-Vis radiation curable screen printing security inks (E1-E4) according to the invention and to prepare comparative UV-Vis radiation curable screen printing security inks (C2-C6, C8 and C10). Table 3B provides the optical properties of security features made from the UV-Vis radiation curable screen printing security inks (E1-E4) according to the present invention, features made from the comparative solvent-based screen printing security inks and features made from the comparative UV-Vis radiation curable screen printing security inks (C1-C10).

E5-E30 and C11-C16 have been prepared with flakes being 5-layers thin film interference pigments (i.e. optically variable pigments) (ChromaFlair®) (flakes P1b), wherein the surface of said flakes has been treated with Fluorolink® P54 (perfluoropolyether functionalized with phosphor (P) containing compounds, in particular with phosphate containing groups) so as to provide a surface treatment layer on said flakes. Tables 4A-11A provide a description of ink vehicles used to prepare UV-Vis radiation curable screen printing security inks (E5-E30) according to the invention and to prepare comparative UV-Vis radiation curable screen printing security inks (C11-C16). Tables 4B-11B provide optical properties of security features made from the UV-Vis radiation curable screen printing security inks (E5-E30) according to the invention and features made from the comparative UV-Vis radiation curable screen printing security inks (C11-C16).

Preparation of the Surface Treatment of Flakes (P1-P4) with Different Compounds (b-g)

TABLE 1

| | Flakes | | |
|---|---|---|---|
| | Flakes (supplier) | Surface-treatment agent (supplier) | Amount wt-% |
| P1a | ChromaFlair ® | — | — |
| P1b | blue-to-red [a] (Viavi Solutions) | Fluorolink ® P54 Perfluoropolyether functionalized with phosphate groups (CAS no. 200013-65-6) (Solvay) | 2 |
| P1c | | Fluorolink ® S10 Perfluoropolyether functionalized with silane groups (CAS no. 223557-70-8) (Solvay) | 3.75 |
| P1d | | Dynasilan ® F8815 Fluoroalkyl functionalized with siloxane groups (CAS no. not available) (Evonik) | 5 |
| P1e | | Dynasilan ® F8261 Silane, triethoxy(3,3,4,4,5,5,6,6,7,7,8,8,8-tridecafluorooctyl)- (CAS no. 51851-37-7) (Evonik) | 2 |
| P1f | | PolyFox™ 156A Perfluoropolyether with sulfate groups (CAS no. 452080-67-0) (Omnova Solutions) | 2 |
| P1g | | Lakeland PAE-185 Alkyl phosphate ester with alkyl = $C_{18}H_{35}$ (CAS no. not available) (Lakeland Laboratories Ltd) | 2 |
| P2a | Pyrisma ® Yellow [b] | — | — |
| P2b | T30-20 (Merck) | Fluorolink ® P54 (Solvay) | 4 |
| P3a | Lumina ® Turquoise | — | — |
| P3b | 9T30D[c] (BASF) | Fluorolink ® P54 (Solvay) | 4 |

[a] Fabry-Perot 5-layers optically variable flakes having a chromium oxide top layer and having a d50 value of 17-21 µm,
[b] mica flakes coated with titanium oxide/tin oxide and having a D50 value of 14-19 µm,
[c] mica flakes coated with titanium oxide having a D50 value of 21 µm.

Method 1a (Fluorolink® P54 for Treating Flakes ChromaFlair® (Viavi Solutions))

Fluorolink® P54 (Solvay, 20 wt-% in water) was dissolved in an equivalent amount of isopropanol (Brenntag-Schweizer, 99%) so as to yield a 10 wt-% solution.

In a 1 liter polypropylene beaker, 50 g of flakes were added to 440 g of isopropanol (Brenntag-Schweizer, 99%) and dispersed at room temperature using a Dispermat (LC220-12) for 10 minutes at 600 rpm. 10 g of said 10 wt-% solution of Fluorolink® P54 were added to the dispersion and further dispersed at room temperature for 15 minutes at 600 rpm. The resulting dispersion was poured on a Buchner funnel equipped with a filter paper under vacuum (water pump) and washed three times with 200 g isopropanol (Brenntag-Schweizer, 99%) and one last time with 200 g acetone (Brenntag-Schweizer, 99%). Finally, the surface-treated high-aspect ratio pigment was dried under vacuum for 5 minutes.

Method 1b (Fluorolink® P54 for Treating Flakes Pyrisma® Yellow T30-20 (Merck) and Lumina® Turquoise 9T30D (BASF))

In a 50 mL polypropylene test tube, 2 g of flakes were added to 17.2 g of isopropanol (Brenntag-Schweizer, 99%) at room temperature. 0.8 g of a 10 wt-% solution of Fluorolink® P54 (procedure described for method 1a) were added and the tube was shaken vigorously for 2 minutes. After sedimentation of the flakes, the top layer of solvent was removed with a syringe and the flakes were subsequently washed two times with 20 g of isopropanol (Brenntag-Schweizer, 99%) and one time with 20 g of acetone (Brenntag-Schweizer, 99%). The so-obtained surface-treated flakes were dried on a paper filter at room temperature for 30 minutes.

Method 2 (Fluorolink® S10 for Treating Flakes ChromaFlair® (Viavi Solutions))

100 g of a solution comprising Fluorolink® S10 (Solvay) was prepared by mixing at room temperature a mixture of a) 0.5 g of acetic acid (Sigma-Aldrich, 99.8%), 2 g of deionized water and 97 g isopropanol (Brenntag-Schweizer, 99%) and b) 0.5 g of Fluorolink® S10 to said mixture. The so-obtained solution was dispersed using a Dispermat (LC220-12) for 30 minutes at 600 rpm so as to obtain a 0.5 wt-% solution of Fluorolink® S10.

In a 50 mL polypropylene test tube, 2 g of flakes were added to 15 g of the 0.5 wt-% of Fluorolink® S10 solution and the tube was shaken vigorously for 2 minutes. The surface-treated flakes were filtered on a Buchner funnel under vacuum (water pump) and while said flakes were still humid, they were placed in a glassware and dried in an oven at 100° C. for 30 minutes before use.

Method 3 (Dynasilan® F8815 for Treating Flakes ChromaFlair® (Viavi Solutions))

100 g of a solution comprising Dynasilan® F8815 was prepared by mixing 2 g of Dynasilan® F8815 (Evonik, >99%) and 98 g of a 50/50 mixture of water and isopropanol (Brenntag-Schweizer, 99%) so as to obtain a 2 wt-% solution of Dynasilan® F8815.

In a 50 mL polypropylene test tube, 2 g of flakes were added to 13 g of isopropanol (Brenntag-Schweizer, 99%). 5 g of the 2 wt-% solution of Dynasilan® F8815 were added to the dispersion and the tube was shaken vigorously for 2 minutes. The surface-treated flakes were filtered on a Buchner funnel under vacuum (water pump) and while said flakes were still humid, they were placed in a glassware and dried in an oven at 100° C. for 30 minutes before use.

Method 4 (Dynasilan® F8261 for Treating Flakes ChromaFlair® (Viavi Solutions))

100 g of a solution comprising Dynasilan® F8261 was prepared by mixing 0.5 g of Dynasilan® F8261 (Evonik, >99%) and 97.5 g of isopropanol (Brenntag-Schweizer, 99%) and 2.0 g of water so as to obtain a 0.5 wt-% solution of Dynasilan® F8261.

In a 50 mL polypropylene test tube, 2 g of flakes were added to 20 g of the 0.5 wt-% solution of Dynasilan® F8261 and the tube was shaken vigorously for 2 minutes. The surface-treated flakes were filtered on a Buchner funnel under vacuum (water pump) and while said flakes were still humid, they were placed in a glassware and dried in an oven at 100° C. for 30 minutes before use.

Method 5 (PolyFox™ 156A for Treating Flakes ChromaFlair® (Viavi Solutions))

100 g of a solution comprising PolyFox™ 156A was prepared by mixing 22.2 g of PolyFox™ 156A (Omnova Solutions, 30 wt-% in water) and 77.8 g of a 50/50 mixture of water and isopropanol (Brenntag-Schweizer, 99%) so as to obtain a 6.67 wt-% solution of PolyFox™ 156A.

In a 50 mL polypropylene test tube, 2 g of flakes were added to 17.4 g of isopropanol (Brenntag-Schweizer, 99%) at room temperature. 0.6 g of the 6.67 wt-% solution of PolyFox™ 156A were added to the dispersion and the tube was shaken vigorously for 2 minutes. The surface-treated flakes were filtered on a Buchner funnel under vacuum (water pump) and while said flakes were still humid, they were placed in a glassware and dried in an oven at 100° C. for 30 minutes before use.

Method 6 (Lakeland PAE-185 for Treating Flakes Chroma-Flair® (Viavi Solutions))

100 g of a solution comprising Lakeland PAE-185 was prepared by mixing 2.4 g of Lakeland PAE-185 (Lakeland Laboratories Ltd, >90%) and 97.6 g of a 50/50 mixture of water and isopropanol (Brenntag-Schweizer, 99%) so as to obtain a 2.2 wt-% solution of Lakeland PAE-185.

In a 50 mL polypropylene test tube, 2 g of flakes were added to 16.2 g of isopropanol (Brenntag-Schweizer, 99%). 1.8 g of the 2.2 wt-% solution of Lakeland PAE-185 were added to the dispersion and the tube was shaken vigorously for 2 minutes. The surface-treated flakes were filtered on a Buchner funnel under vacuum (water pump) and while said flakes were still humid, they were placed in a glassware and dried in an oven at 100° C. for 30 minutes before use.

Description of the Ingredients of the UV-Vis Radiation Curable Screen Printing Ink Vehicle V0-V32

TABLE 2

| Ingredients | | |
|---|---|---|
| Ingredient | Commercial name (supplier) | Chemical name (CAS number) |
| Cycloaliphatic epoxide | Uvacure ® 1500 (Allnex) | 7-oxabicyclo[4.1.0]hept-3-ylmethyl 7-oxabicyclo[4.1.0]heptane-3-carboxylate (2386-87-0) |
| Cycloaliphatic epoxide | UviCure S128 (Lambson) | bis[(3,4-epoxycyclohexyl)methyl] adipate (3130-19-6) |
| Aliphatic epoxide | Grilonit ® RV1806 (EMS-Chemie) | 1,4-butanediol diglycidyl ether (2425-79-8) |
| Vinyl ether | DVE-2 (BASF) | 1,1'-[oxybis(ethyleneoxy)] diethylene (2425-79-8) |
| Oxetane | Curalite ™OX (Perstorp) | 3-ethyloxetane-3-methanol (3047-32-3) |
| Tetraacrylate | MIRAMER M4004 (RAHN) | ethoxylated pentaerythritol tetraacrylates (51728-26-8) |
| Polyhydroxy compound | POLYOL R4631 (Perstorp) | pentaerythritol, ethoxylated and propoxylated (30374-35-7) |
| Polyhydroxy compound | Boltorn ™ P1000 (Perstorp) | blend of dendritic polyester polyol and polyether polyol (not available) |
| Cationic photoinitiator | Omnicat 440 (IGM) | bis(p-tolyl)iodonium hexafluorophosphate (60565-88-0) |
| Free radical photoinitiator | Omnirad 1173 (IGM) | 2-hydroxy-2-methylpropiophenone (7473-98-5) |
| Sensitizer | GENOCURE ® ITX (RAHN) | 2-isopropyl-9H-thioxanthen-9-one (5495-84-1) |
| Filler | Aerosil ® 200 (EVONIK) | silicon dioxide (7631-86-9) |
| Antifoaming agent | Tego ® Airex 900 (EVONIK) | siloxanes and silicones, di-Me, reaction products with silica (67762-90-7) |

TABLE 2-continued

| Ingredients | | |
|---|---|---|
| Ingredient | Commercial name (supplier) | Chemical name (CAS number) |
| Solvent | Propylene carbonate (BRENNTAG-SCHWEIZERHALL) | propylene carbonate (108-32-7) |

Inks (E1-E4 and C1-C10) Preparation and Printed Security Features Obtained Thereof A0. Preparation of the Solvent Based Ink Vehicle S0 (Table 3A-1) and the UV-Vis Curable Ink Vehicle V0 (Table 3A-2)

TABLE 3A-1

| Solvent-based ink vehicle S0 | | | |
|---|---|---|---|
| Ingredient | Commercial name (supplier) | Chemical name (CAS number) | Amount [wt-%] |
| Solvent | Butylglycol acetate (Brenntag-Schweizer) | 2-Butoxyethyl acetate (112-07-2) | 51.5 |
| Resin | Neocryl B-728 (DSM Neoresins) | Acrylic homopolymer, MW~65000 g/mol (not available) | 20.0 |
| Solvent | Ethyl 3-ethoxypropionate (Brenntag-Schweizer) | Ethyl 3-ethoxypropionate (763-69-9) | 16.9 |
| Solvent | Dowanol DPM (Dow Chemicals) | (2-Methoxymethylethoxy) propanol (34590-94-8) | 7.5 |
| Antifoaming agent | Byk-1752 (BYK) | Silicone-free defoamer (not available) | 3.7 |
| Filler | Aerosil 200 (Evonik) | Silicon dioxide (7631-86-9) | 0.4 |
| Viscosity | | 1170 mPas | |

Ingredients of the ink vehicle S0 provided in Table 3A-1 were mixed and dispersed at room temperature using a Dispermat (model CV-3) for 15 minutes at 1000-1500 rpm so as to yield 100 g of the ink vehicle S0.

Viscosity values provided in Table 3A-1 were independently measured on about 15 g of the ink vehicle at 25° C. on a Brookfield viscometer (model "DV-I Prime", spindle S27 at 100 rpm).

TABLE 3A-2

| UV-Vis radiation curable ink vehicle V0 | | |
|---|---|---|
| Ingredient | Commercial name (supplier) | Amount wt-% |
| Cycloaliphatic epoxide | Uvacure ® 1500 | 44.5 |
| Vinyl ether | DVE-2 | 5 |
| Oxetane | Curalite ™ Ox | 5 |
| Tetraacrylate | MIRAMER M4004 | 20 |
| Polyhydroxy compound | POLYOL R4631 | 10 |
| Cationic photoinitiator | Omnicat 440 | 4.13 |
| Free radical photoinitiator | Omnirad 1173 | 4.58 |
| Sensitizer | GENOCURE ® ITX | 0.46 |
| Filler | Aerosil ® 200 | 2.0 |
| Antifoaming agent | Tego ® Airex 900 | 2.5 |
| Solvent | Propylene carbonate | 1.83 |
| Viscosity | | 526 mPas |

Ingredients of the ink vehicle V0 provided in Table 3A-2 were mixed and dispersed at room temperature using a Dispermat (model CV-3) for 15 minutes at 1000-1500 rpm so as to yield 100 g of the ink vehicle.

The viscosity value provided in Table 3A-2 was measured on about 15 g of the ink vehicle at 25° C. on a Brookfield viscometer (model "DV-1 Prime", spindle S27 at 100 rpm).

A1-1. Preparation of Comparative Solvent-Based Screen Printing Security Inks (C1, C7 and C9)

Comparative solvent-based screen printing security inks (C1, C7 and C9) were prepared with the solvent-based ink vehicle S0 described in Table 3A-1 and flakes P1a, P2a and P3a respectively (i.e. used as commercially available without any further surface treatment).

17 wt-% of the flakes P1a, P2a and P3a were independently added to 83 wt-% of the ink vehicle S0 and dispersed at room temperature using a Dispermat (model CV-3) for 5 minutes at 800-1000 rpm so as to independently obtain 20 g of the comparative solvent-based screen printing security inks.

A1-2. Preparation of Comparative UV-Vis Radiation Curable Screen Printing Security Inks (C2-C6, C8 and C10) and UV-Vis Radiation Curable Screen Printing Security Inks According to the Invention (E1-E4)

Comparative UV-Vis radiation curable screen printing security inks (C2, C8 and C10) were prepared with the ink vehicle V0 described in Table 3A-2 and flakes P1a, P2a and P3a, respectively (i.e. used as commercially available without any further surface treatment).

Comparative UV-Vis radiation curable screen printing security inks (C3-C6) were prepared with the ink vehicle V0 described in Table 3A and flakes P1d, P1e, P1f and P1g, respectively (i.e. comprising a surface treatment which was not based on perfluoropolyethers being functionalized with one or more phosphate containing groups or one or more silane containing groups).

The UV-Vis radiation curable screen printing security inks (E1-E4) according to the invention were prepared with the ink vehicle V0 described in Table 3A-2 and surface treated flakes P1 b, P1c, P2b and P3b, respectively.

17 wt-% of the flakes were independently added to 83 wt-% of the ink vehicle V0 and dispersed at room temperature using a Dispermat (model CV-3) for 5 minutes at 800-1000 rpm so as to independently obtain 20 g of the Comparative UV-Vis radiation curable screen printing security inks (C2-C6, C8 and C10) and the UV-Vis radiation curable screen printing security inks according to the invention (E1-E4).

A2. Preparation of Security Features with Inks (E1-E4 and C1-C10)

The comparative solvent-based screen printing security inks (C1, C7 and C9), the comparative UV-Vis radiation curable screen printing security inks (C2-C6, C8 and C10) and the UV-Vis radiation curable screen printing security inks (E1-E4) according to the invention were independently applied by hand on a piece of fiduciary paper (BNP paper from Louisenthal, 100 g/m², 14.5 cm×17.5 cm) using a 90 thread/cm screen (230 mesh). The printed pattern had a size of 6 cm×10 cm.

After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

A3. Optical Properties of Security Features Made from the Inks E1-E4 and C1-C10 (Table 3B)

A3-a. The optical properties of the security features described herein were determined with a goniometer (Goniospektrometer Codec WI-10 5&5 by Phyma GmbH Austria) and are provided in Table 3B below.

The assessment was carried out as follows: the L*a*b* values of the printed security features were determined at two angles, respectively 22.5° to the normal with illumination at 22.5° (denoted below as 22.5°/22.5° in Table 3C-1) and 450 to the normal with illumination at 450 (denoted below as 45°/45° in Table 3C-1). The C* (chroma) values were calculated from a* and b* values according to the CIELAB (1976) color space, wherein:

$$C^* = \sqrt{(a^*)^2 + (b^*)^2}$$

A3-b. A relative visual assessment was also carried out (Table 3B) for chroma and color travel with the following criteria:

Chroma (corresponding to a measure of the color intensity or color saturation) was observed under diffuse illumination (such as the light coming through a window with no direct sunlight), the sample to observe being held vertically against the diffuse light source and the angle of view being chosen such that the diffuse light is not blocked by the head of the observer (meaning at a vertical angle comprised between about 250 and about 45°).

The following scale was used: excellent, good, sufficient, insufficient. Insufficient chroma refers to samples that are not suitable to be used as security features for highly demanding end-use applications. Color travel (corresponding to the change of color or hue as a function of the viewing angle) was observed by first looking at the sample at the same vertical angle as for the observation of chroma, the sample being held vertically against the diffuse light source. The angle between the sample and the diffuse light source was then modified back and forth while observing the change of color. The following scale was used: excellent, good, sufficient, insufficient. Insufficient color travel means that the color difference upon changing the viewing angle is not easily perceived or not perceived at all by the naked eye, thus making the security feature not suitable for highly demanding end-use applications.

TABLE 3B

Optical properties of the security features made from the inks E1-E4 and C1-C10

| | | | Visual assessment | | Goniometer (Phyma) | |
| --- | --- | --- | --- | --- | --- | --- |
| | | | | | C* | C° |
| Sample No | Pigments | Ink Vehicle | Chroma | Color travel | 22.5/22.5 | 45/45 |
| C1 | P1a (ChromaFlair ®) | S0 | Good | Sufficient | 40 | 33 |
| C2 | P1a (ChromaFlair ®) | V0 | Insufficient | Insufficient | 11 | 12 |

TABLE 3B-continued

Optical properties of the security features made from the inks E1-E4 and C1-C10

| Sample No | Pigments | Ink Vehicle | Visual assessment | | Goniometer (Phyma) | |
| | | | Chroma | Color travel | C* 22.5/22.5 | C° 45/45 |
|---|---|---|---|---|---|---|
| E1 | P1b (ChromaFlair ®) | V0 | Excellent | Excellent | 45 | 37 |
| E2 | P1c (ChromaFlair ®) | V0 | Good | Good | 40 | 30 |
| C3 | P1d (ChromaFlair ®) | V0 | Insufficient | Insufficient | 15 | 13 |
| C4 | P1e (ChromaFlair ®) | V0 | Insufficient | Insufficient | 16 | 15 |
| C5 | P1f (ChromaFlair ®) | V0 | Insufficient | Insufficient | 16 | 14 |
| C6 | P1g (ChromaFlair ®) | V0 | Insufficient | Insufficient | 17 | 18 |
| C7 | P2a (Pyrisma ®) | S0 | Sufficient | Sufficient | 28 | 31 |
| C8 | P2a (Pyrisma ®) | V0 | Insufficient | Sufficient | 18 | 20 |
| E3 | P2b (Pyrisma ®) | V0 | Good | Sufficient | 30 | 33 |
| C9 | P3a (Lumina ®) | S0 | Good | Sufficient | 19 | 19 |
| C10 | P3a (Lumina ®) | V0 | Insufficient | Sufficient | 12 | 9 |
| E4 | P3b (Lumina ®) | V0 | Excellent | Sufficient | 19 | 18 |

As shown in Table 3B, the security features made from the inks E1-E4 according to the invention exhibited strongly improved optical performance in comparison with the security features made from the comparative UV-Vis radiation curable screen printing security inks C2, C8 and C10 (flakes used as commercially available) and with the security features made from the UV-Vis radiation curable screen printing security inks C3-C6 (different surface treatment based on compounds not consisting of perfluoropolyethers being functionalized with one or more phosphate containing groups or one or more silane containing groups). The security features made from the inks E1-E4 according to the invention exhibited similar or improved optical performance in comparison with the security features made from the comparative solvent-based inks C1, C7 and C9 while avoiding the issues associated with solvent-based inks (VOC, difficulties to comply with environmental regulations such as REACH and GHS, complex equipment to recover and purify evaporated solvents).

Inks (E5-E6 and C11) Preparation and Printed Security Features Obtained Thereof

B. Preparation of UV-Vis Radiation Curable Ink Vehicle V1-V3 (Table 4A)

TABLE 4A

UV-Vis radiation curable ink vehicles V1-V3

| Ingredient | Commercial name (supplier) | V1 | V2 wt-% | V3 |
|---|---|---|---|---|
| Cycloaliphatic epoxide | Uvacure ® 1500 | 44.5 | | |
| Cycloaliphatic epoxide | UviCure S128 | | 44.5 | |
| Aliphatic epoxide | Grilonit ® RV1806 | | | 44.5 |
| Vinyl ether | DVE-2 | 5 | 5 | 5 |
| Oxetane | Curalite ™ Ox | 5 | 5 | 5 |
| Tetraacrylate | MIRAMER M4004 | 20 | 20 | 20 |
| Polyhydroxy compound | POLYOL R4631 | 10 | 10 | 10 |
| Cationic photoinitiator | Omnicat 440 | 4.13 | 4.13 | 4.13 |

TABLE 4A-continued

UV-Vis radiation curable ink vehicles V1-V3

| Ingredient | Commercial name (supplier) | V1 | V2 wt-% | V3 |
|---|---|---|---|---|
| Free radical photoinitiator | Omnirad 1173 | 4.58 | 4.58 | 4.58 |
| Sensitizer | GENOCURE ® ITX | 0.46 | 0.46 | 0.46 |
| Filler | Aerosil ® 200 | 2.0 | 2.0 | 2.0 |
| Antifoaming agent | Tego ® Airex 900 | 2.5 | 2.5 | 2.5 |
| Solvent | Propylene carbonate | 1.83 | 1.83 | 1.83 |
| Viscosity/mPas | | 500 | 895 | 90 |

Ingredients of the respective ink vehicles V1-V3 provided in Table 4A were mixed and dispersed at room temperature using a Dispermat (model CV-3) for 15 minutes at 1000-1500 rpm so as to yield 100 g of the ink vehicle.

Viscosity values provided in Table 4A were independently measured on about 15 g of the ink vehicle at 25° C. on a Brookfield viscometer (model "DV-1 Prime", spindle S27 at 100 rpm for V1-V2 and spindle S21 at 100 rpm for V3).

B1. Preparation of UV-Vis Radiation Curable Screen Printing Security Inks (E5-E6 and C11)

The comparative UV-Vis radiation curable screen printing security ink (C11) and the UV-Vis radiation curable screen printing security inks (E5-E6) according to the invention were prepared with the respective ink vehicle V1-V3 described in Table 4A and flakes P1 b. The security ink E5 was identical to the ink E1 of Table 3B and was prepared at the same time as the UV-Vis radiation curable screen printing security ink (E6) according to the invention and the comparative UV-Vis radiation curable screen printing security ink (C11).

17 wt-% of the flakes P1b were independently added to 83 wt-% of the respective ink vehicle V1-V3 and dispersed at room temperature using a Dispermat (model CV-3) for 5 minutes at 800-1000 rpm so as to independently obtain 20 g of the UV-Vis radiation curable screen printing security inks (E5-E6) according to the invention and the comparative UV-Vis radiation curable screen printing security ink (C11).
B2. Preparation and Optical Properties of Security Features Made from the Inks E5-E6 and C11 (Table 4B)

The comparative UV-Vis radiation curable screen printing security ink (C11) and the UV-Vis radiation curable screen printing security inks (E5-E6) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the same goniometer as described under items A3-a and A3-b and are provided in Table 4B.
B3. Results

TABLE 4B

Optical properties of the security features made from the inks E5-E6 and C11

| Sample No | Ink vehicle | Visual assessment Chroma | Visual assessment Color travel | Goniometer (Phyma) C* 22.5/22.5 | Goniometer (Phyma) C. ° 45/45 |
|---|---|---|---|---|---|
| E5 | V1 | Good | Good | 44 | 36 |
| E6 | V2 | Excellent | Excellent | 51 | 41 |
| C11 | V3 | Insufficient | Insufficient | 14 | 16 |

As shown in Table 4B, the security feature made of the comparative ink C11 comprising an aliphatic epoxide instead of a cycloaliphatic epoxide exhibited a poorer visual appearance and lower values of chroma as measured by the goniometer.

Inks (E7-E10) Preparation and Printed Security Features Obtained Thereof
C0. Preparation of UV-Vis Radiation Curable Ink Vehicle V4-V7 (Table 5A)

TABLE 5A

UV-Vis radiation curable ink vehicles V4-V7

| Ingredient | Commercial name (supplier) | V4 wt-% | V5 wt-% | V6 wt-% | V7 wt-% |
|---|---|---|---|---|---|
| Cycloaliphatic epoxide | Uvacure ® 1500 | 69.08 | 54.5 | 44.5 | 34.5 |
| Vinyl ether | DVE-2 | 5 | 5 | 5 | 5 |
| Oxetane | Curalite ™ Ox | 5 | 5 | 5 | 5 |
| Tetraacrylate | MIRAMER M4004 | — | 10 | 20 | 30 |
| Polyhydroxy compound | POLYOL R4631 | 10 | 10 | 10 | 10 |
| Cationic photoinitiator | Omnicat 440 | 4.13 | 4.13 | 4.13 | 4.13 |
| Free radical photoinitiator | Omnirad 1173 | — | 4.58 | 4.58 | 4.58 |
| Sensitizer | GENOCURE ® ITX | 0.46 | 0.46 | 0.46 | 0.46 |
| Filler | Aerosil ® 200 | 2.0 | 2.0 | 2.0 | 2.0 |
| Antifoaming agent | Tego ® Airex 900 | 2.5 | 2.5 | 2.5 | 2.5 |
| Solvent | Propylene carbonate | 1.83 | 1.83 | 1.83 | 1.83 |
| | Viscosity/mPas | 633 | 378 | 526 | 332 |

Ingredients of the respective ink vehicles V4-V7 provided in Table 5A were mixed and dispersed at room temperature using a Dispermat (model CV-3) for 15 minutes at 1000-1500 rpm so as to yield 100 g of the respective ink vehicle.

Viscosity values provided in Table 5A were independently measured on about 15 g of the ink vehicle at 25° C. on a Brookfield viscometer (model "DV-I Prime", spindle S27 at 100 rpm for V4 and V6 and spindle S21 at 100 rpm for V5 and V7).

C1. Preparation of UV-Vis Radiation Curable Screen Printing Security Inks (E7-E10)

The UV-Vis radiation curable screen printing security inks (E7-E10) according to the invention were prepared with the respective ink vehicle V4-V7 described in Table 5A and flakes P1 b. The security ink E9 was identical to the ink E1 of Table 3B and was prepared at the same time as the inks E7-E10.

17 wt-% of the flakes P1b were independently added to 83 wt-% of the respective ink vehicle and V4-V7 and dispersed at room temperature using a Dispermat (model CV-3) for 5 minutes at 800-1000 rpm so as to independently obtain 20 g of the UV-Vis radiation curable screen printing security inks (E7-E10) according to the invention.

C2. Preparation and Optical Properties of Security Features Made from the Inks E7-E10 (Table 5B)

The UV-Vis radiation curable screen printing security inks (E7-E10) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the goniometer as described under items A3-a and A3-b and are provided in Table 5B.
C3. Results

TABLE 5B

Optical properties of the security features made from the inks E7-E10

| Sample No | Ink vehicle | Visual assessment Chroma | Visual assessment Color travel | Goniometer (Phyma) C* 22.5/22.5 | Goniometer (Phyma) C. ° 45/45 |
|---|---|---|---|---|---|
| E7 | V4 | Excellent | Good | 47 | 38 |
| E8 | V5 | Good | Good | 45 | 37 |
| E9 | V6 | Good | Good | 45 | 37 |
| E10 | V7 | Sufficient | Sufficient | 43 | 35 |

As shown in Table 5B, the UV-Vis radiation curable screen printing security inks according to the invention comprising either a cycloaliphatic epoxide and a cationic photoinitiator (E7) (i.e. an ink comprising a cationically curable ink vehicle) or a combination of a cycloaliphatic epoxide and a tetraacrylate with a cationic photoinitiator and a free radical photoinitiator (E8-E10) (inks comprising a hybrid curable ink vehicle) exhibited a sufficient to excellent visual aspect and high values for the goniometer measurement.

Inks (E11-E13 and C12) Preparation and Printed Security Features Obtained Thereof D0. Preparation of UV-Vis Radiation Curable Ink V8-V11 (Table 6A)

TABLE 6A

UV-Vis radiation curable ink vehicles V8-V11

| Ingredient | Commercial name (supplier) | V8 | V9 | V10 | V11 |
|---|---|---|---|---|---|
| | | | wt-% | | |
| Cycloaliphatic epoxide | Uvacure—® 1500 | 40.05 | 44.5 | 48.95 | 57.85 |
| Vinyl ether | DVE-2 | 6.23 | 5 | 3.56 | 1.78 |
| Oxetane | Curalite ™ Ox | 6.23 | 5 | 3.56 | 1.78 |
| Tetraacrylate | MIRAMER M4004 | 20 | 20 | 20 | 20 |
| Polyhydroxy compound | POLYOL R4631 | 11.99 | 10 | 8.43 | 3.09 |
| Cationic photoinitiator | Omnicat 440 | 4.13 | 4.13 | 4.13 | 4.13 |
| Free radical photoinitiator | Omnirad 1173 | 4.58 | 4.58 | 4.58 | 4.58 |
| Sensitizer | GENOCURE ® ITX | 0.46 | 0.46 | 0.46 | 0.46 |
| Filler | Aerosil ® 200 | 2.0 | 2.0 | 2.0 | 2.0 |
| Antifoaming agent | Tego ® Airex 900 | 2.5 | 2.5 | 2.5 | 2.5 |
| Solvent | Propylene carbonate | 1.83 | 1.83 | 1.83 | 1.83 |
| | Viscosity/mPas | 400 | 600 | 780 | 1000 |

Ingredients of the respective ink vehicles V8-V11 provided in Table 6A were mixed and dispersed at room temperature using a Dispermat (model CV-3) for 15 minutes at 1000-1500 rpm so as to yield 100 g of the respective ink vehicle.

Viscosity values provided in Table 6A were independently measured on about 15 g of the ink vehicle at 25° C. on a Brookfield viscometer (model "DV-1 Prime", spindle S27 at 100 rpm for V8-V11).

D1. Preparation of UV-Vis Radiation Curable Screen Printing Security Inks (E11-E13 and C12)

The comparative UV-Vis radiation curable screen printing security ink (C12) and the UV-Vis radiation curable screen printing security inks (E11-E13) according to the invention were prepared with the respective ink vehicle V8-V11 described in Table 6A and flakes P1b. The security ink E12 was identical to the ink E1 of Table 3B and was prepared at the same time as the inks E11-E13 and C12.

17 wt-% of the flakes P1b were independently added to 83 wt-% of the respective ink vehicle V8-V11 and dispersed at room temperature using a Dispermat (model CV-3) for 5 minutes at 800-1000 rpm so as to independently obtain 20 g of the UV-Vis radiation curable screen printing security inks (E11-E13) according to the invention and the comparative UV-Vis radiation curable screen printing security ink (C12).

D2. Preparation and Optical Properties of Security Features Made from the Inks E11-E13 and C12 (Table 6B)

The UV-Vis radiation curable screen printing security inks (E11-E13) according to the invention and the comparative UV-Vis radiation curable screen printing security inks (C12) were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the goniometer as described under items A3-a and A3-b and are provided in Table 6B.

D3. Results

TABLE 6B

Optical properties of the security features made from the inks E11-E13 and C12

| | | Visual assessment | | Goniometer (Phyma) | |
|---|---|---|---|---|---|
| Sample No | Ink vehicle | Chroma | Color travel | C* 22.5/22.5 | C. ° 45/45 |
| E11 | V8 | Good | Good | 43 | 33 |
| E12 | V9 | Good | Good | 42 | 36 |
| E13 | V10 | Sufficient | Sufficient | 43 | 34 |
| C12 | V11 | Insufficient | Insufficient | 33 | 26 |

As shown in Table 6B, the UV-Vis radiation curable screen printing security inks according to the invention comprising a total amount of the cycloaliphatic epoxide and the tetraacrylate within the claimed range exhibited improved optical performance than the comparative ink C12 comprising a total amount of the cycloaliphatic epoxide and the tetraacrylate of 77.85 wt-%, the weight percent being based on the total weight of the ink vehicle.

Inks (E14-E17 and C13) Preparation and Printed Security Features Obtained Thereof E0. Preparation of UV-Vis Radiation Curable Ink Vehicle V12-V16 (Table 7)

TABLE 7A

UV-Vis radiation curable ink vehicles V12-V16

| Ingredient | Commercial name (supplier) | V12 | V13 | V14 | V15 | V16 |
|---|---|---|---|---|---|---|
| | | | | wt-% | | |
| Cycloaliphatic epoxide | Uvacure ® 1500 | 54.5 | 49.5 | 44.5 | 39.5 | 34.5 |
| Vinyl ether | DVE-2 | — | 5 | 10 | 15 | 20 |
| Tetraacrylate | MIRAMER M4004 | 20 | 20 | 20 | 20 | 20 |
| Polyhydroxy compound | POLYOL R4631 | 10 | 10 | 10 | 10 | 10 |
| Cationic photoinitiator | Omnicat 440 | 4.13 | 4.13 | 4.13 | 4.13 | 4.13 |
| Free radical photoinitiator | Omnirad 1173 | 4.58 | 4.58 | 4.58 | 4.58 | 4.58 |
| Sensitizer | GENOCURE ® ITX | 0.46 | 0.46 | 0.46 | 0.46 | 0.46 |
| Filler | Aerosil ® 200 | 2.0 | 2.0 | 2.0 | 2.0 | 2.0 |

TABLE 7A-continued

| | | UV-Vis radiation curable ink vehicles V12-V16 | | | | |
|---|---|---|---|---|---|---|
| Ingredient | Commercial name (supplier) | V12 | V13 | V14 | V15 | V16 |
| Antifoaming agent | Tego ® Airex 900 | 2.5 | 2.5 | 2.5 | 2.5 | 2.5 |
| Solvent | Propylene carbonate | 1.83 | 1.83 | 1.83 | 1.83 | 1.83 |
| Viscosity/mPas | | 1330 | 1020 | 610 | 241 | 149 |

Ingredients of the respective ink vehicles V12-V16 provided in Table 7A were mixed and dispersed at room temperature using a Dispermat (model CV-3) for 15 minutes at 1000-1500 rpm so as to yield 100 g of the respective ink vehicle.

Viscosity values provided in Table 7A were independently measured on about 15 g of the ink vehicle at 25° C. on a Brookfield viscometer (model "DV-I Prime", spindle S27 at 100 rpm for V12-V14, and spindle S21 at 100 rpm for V15 and V16).

E1. Preparation of UV-Vis Radiation Curable Screen Printing Security Inks (E14-E17 and C13)

The UV-Vis radiation curable screen printing security inks (E14-E17) according to the invention and the comparative UV-Vis radiation curable screen printing security ink (C13) were prepared with the respective ink vehicle V12-V16 described in Table 7A and flakes P1b. 17 wt-% of the flakes P1b were independently added to 83 wt-% of the respective ink vehicle V12-V16 and dispersed at room temperature using a Dispermat (model CV-3) for 5 minutes at 800-1000 rpm so as to independently obtain 20 g of the UV-Vis radiation curable screen printing security inks (E14-E17) according to the invention and the comparative UV-Vis radiation curable screen printing security inks (C13).

E2. Preparation and Optical Properties of Security Features Made from the Inks E14-E17 and C13 (Table 7B)

The UV-Vis radiation curable screen printing security ink (E14-E17) according to the invention and the comparative UV-Vis radiation curable screen printing security ink (C13) were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer as described under items A3-a and A3-b, and are provided in Table 7B.

E3. Results

TABLE 7B

Optical properties of the security features made from the inks E14-E17 and C13)

| | | Visual assessment | | Goniometer (Phyma) | |
|---|---|---|---|---|---|
| Sample No | Ink vehicle | Chroma | Color travel | C* 22.5/22.5 | C. ° 45/45 |
| E14 | V12 | Good | Good | 41 | 33 |
| E15 | V13 | Good | Good | 41 | 34 |
| E16 | V14 | Sufficient | Good | 41 | 34 |
| E17 | V15 | Sufficient | Sufficient | 41 | 32 |
| C13 | V16 | Insufficient | Sufficient | 39 | 30 |

As shown in Table 7B, the UV-Vis radiation curable screen printing security inks according to the invention comprising an amount of the vinyl ether within the claimed range exhibited improved performance compared to the comparative ink C13 comprising the vinyl ether in an amount of 20 wt-% (the weight percent being based on the total weight of the ink vehicle) which suffered from poor and insufficient optical properties.

Inks (E18-E22) Preparation and Printed Security Features Obtained Thereof

F0. Preparation of UV-Vis Radiation Curable Inks V17-V21 (Table 8A)

TABLE 8A

| | | UV-Vis radiation curable ink vehicles V17-V21 | | | | |
|---|---|---|---|---|---|---|
| Ingredient | Commercial name (supplier) | V17 | V18 | V19 | V20 | V21 |
| | | wt-% | | | | |
| Cycloaliphatic epoxide | Uvacure ® 1500 | 49.5 | 44.5 | 39.5 | 34.5 | 29.5 |
| Oxetane | Curalite ™Ox | 5 | 10 | 15 | 20 | 25 |
| Tetraacrylate | MIRAMER M4004 | 20 | 20 | 20 | 20 | 20 |
| Polyhydroxy compound | POLYOL R4631 | 10 | 10 | 10 | 10 | 10 |
| Cationic photoinitiator | Omnicat 440 | 4.13 | 4.13 | 4.13 | 4.13 | 4.13 |
| Free radical photoinitiator | Omnirad 1173 | 4.58 | 4.58 | 4.58 | 4.58 | 4.58 |
| Sensitizer | GENOCURE ® ITX | 0.46 | 0.46 | 0.46 | 0.46 | 0.46 |
| Filler | Aerosil ® 200 | 2.0 | 2.0 | 2.0 | 2.0 | 2.0 |

TABLE 8A-continued

UV-Vis radiation curable ink vehicles V17-V21

| Ingredient | Commercial name (supplier) | V17 | V18 | V19 | V20 | V21 |
|---|---|---|---|---|---|---|
| Antifoaming agent | Tego ® Airex 900 | 2.5 | 2.5 | 2.5 | 2.5 | 2.5 |
| Solvent | Propylene carbonate | 1.83 | 1.83 | 1.83 | 1.83 | 1.83 |
| Viscosity/mPas | | 950 | 670 | 331 | 282 | 217 |

Ingredients of the respective ink vehicles V17-V21 provided in Table 8A were mixed and dispersed at room temperature using a Dispermat (model CV-3) for 15 minutes at 1000-1500 rpm so as to yield 100 g of the respective ink vehicle.

Viscosity values provided in Table 8A were independently measured on about 15 g of the ink vehicle at 25° C. on a Brookfield viscometer (model "DV-1 Prime", spindle S27 at 100 rpm for V17 and V18, and spindle S21 at 100 rpm for V19-V21).

F1. Preparation of UV-Vis Radiation Curable Screen Printing Security Inks (E18-E22)

The UV-Vis radiation curable screen printing security inks (E18-E22) according to the invention were prepared with the respective ink vehicle V17-V21 described in Table 8A and flakes P1 b.

17 wt-% of the flakes P1b were independently added to 83 wt-% of the respective ink vehicle V17-V21 and dispersed at room temperature using a Dispermat (model CV-3) for 5 minutes at 800-1000 rpm so as to independently obtain 20 g of the UV-Vis radiation curable screen printing security inks (E18-E22) according to the invention.

F2. Preparation and Optical Properties of Security Features Made from the Inks E18-E22 (Table 8B)

The UV-Vis radiation curable screen printing security ink (E18-E22) according to the invention were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer as described under items A3-a and A3-b and are provided in Table 8B.

F3. Results

TABLE 8B

Optical properties of the security features made from the inks E18-E22

| | | Visual assessment | | Goniometer (Phyma) | |
|---|---|---|---|---|---|
| Sample No | Ink vehicle | Chroma | Color travel | C* 22.5/22.5 | C ° 45/45 |
| E18 | V17 | Good | Good | 41 | 34 |
| E19 | V18 | Good | Good | 47 | 38 |
| E20 | V19 | Excellent | Excellent | 50 | 38 |
| E21 | V20 | Excellent | Excellent | 50 | 39 |
| E22 | V21 | Good | Good | 44 | 34 |

As shown in Table 8B, the UV-Vis radiation curable screen printing security inks according to the invention comprising one or more oxetanes exhibited a good to excellent visual aspect and high values for the goniometer measurement.

Inks (E23-E24 and C14-C16) Preparation and Printed Security Features Obtained Thereof G0. Preparation of UV-Vis Radiation Curable Ink Vehicle V22-V26 (Table 9A)

TABLE 9A

UV-Vis radiation curable ink vehicles V22-V26

| Ingredient | Commercial name (supplier) | V22 | V23 | V24 | V25 | V26 |
|---|---|---|---|---|---|---|
| | | wt-% | | | | |
| Cycloaliphatic epoxide | Uvacure ® 1500 | 44.5 | 39.5 | 34.5 | 29.5 | 29.5 |
| Vinyl ether | DVE-2 | 5 | 7.5 | 10 | 15 | 10 |
| Oxetane | Curalite ™Ox | 5 | 7.5 | 10 | 10 | 15 |
| Tetraacrylate | MIRAMER M4004 | 20 | 20 | 20 | 20 | 20 |
| Polyhydroxy compound | POLYOL R4631 | 10 | 10 | 10 | 10 | 10 |
| Cationic photoinitiator | Omnicat 440 | 4.13 | 4.13 | 4.13 | 4.13 | 4.13 |
| Free radical photoinitiator | Omnirad 1173 | 4.58 | 4.58 | 4.58 | 4.58 | 4.58 |
| Sensitizer | GENOCURE ® ITX | 0.46 | 0.46 | 0.46 | 0.46 | 0.46 |
| Filler | Aerosil ® 200 | 2.0 | 2.0 | 2.0 | 2.0 | 2.0 |

TABLE 9A-continued

UV-Vis radiation curable ink vehicles V22-V26

| Ingredient | Commercial name (supplier) | V22 | V23 | V24 | V25 | V26 |
|---|---|---|---|---|---|---|
| Antifoaming agent | Tego ® Airex 900 | 2.5 | 2.5 | 2.5 | 2.5 | 2.5 |
| Solvent | Propylene carbonate | 1.83 | 1.83 | 1.83 | 1.83 | 1.83 |
| Viscosity/mPas | | 570 | 279 | 222 | 162 | 172 |

Ingredients of the respective ink vehicles V22-V26 provided in Table 9A were mixed and dispersed at room temperature using a Dispermat (model CV-3) for 15 minutes at 1000-1500 rpm so as to yield 100 g of the respective ink vehicle.

Viscosity values provided in Table 9A were independently measured on about 15 g of the ink vehicle at 25° C. on a Brookfield viscometer (model "DV-I Prime", spindle S27 at 100 rpm for V22, and spindle S21 at 100 rpm for V23-V26).

G1. Preparation of UV-Vis Radiation Curable Screen Printing Security Inks (E23-E24 and C14-C16)

The comparative UV-Vis radiation curable screen printing security inks (C14-C16) and the UV-Vis radiation curable screen printing security inks (E23-E24) according to the invention and were prepared with the respective ink vehicle V22-V26 described in Table 9A and flakes P1 b. The security ink E23 was identical to the ink E1 of Table 3B and was prepared at the same time as the inks E23-E24 and C14-C16.

17 wt-% of the flakes P1 b were independently added to 83 wt-% of the respective ink vehicle V23-V27 and dispersed at room temperature using a Dispermat (model CV-3) for 5 minutes at 800-1000 rpm so as to independently obtain 20 g of the UV-Vis radiation curable screen printing security inks (E23-E24) according to the invention and the comparative UV-Vis radiation curable screen printing security ink (C14-C16) described in Table 9B.

G2. Preparation and Optical Properties of Security Features Made from the Inks E21-E22 and C14-C16 (Table 9B)

The UV-Vis radiation curable screen printing security inks (E23-E24) according to the invention and the comparative UV-Vis radiation curable screen printing security ink (C14-C16) were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The optical properties of the security features described above were determined both visually and using the goniometer as described under items A3-a and A3-b and are provided in Table 9B.

G3. Results

TABLE 9B

Optical properties of the security features made from the inks E23-E24 and C14-C16

| Sample No | Ink vehicle | Visual assessment | | Goniometer (Phyma) | |
|---|---|---|---|---|---|
| | | Chroma | Color travel | C* 22.5/22.5 | C. ° 45/45 |
| C14 | V24 | Insufficient | Sufficient | 33 | 27 |
| C15 | V25 | Insufficient | Insufficient | 25 | 22 |
| C16 | V26 | Insufficient | Insufficient | 27 | 24 |
| E23 | V22 | Good | Good | 43 | 34 |
| E24 | V23 | Good | Sufficient | 40 | 33 |

As shown in Table 9B, the UV-Vis radiation curable screen printing security inks according to the invention comprising one or more vinyl ethers and one or more oxetanes in an amount of less than or equal to 15 wt-% (the weight percent being based on the total weight of the ink vehicle) exhibited a sufficient to excellent visual aspect and high values for the goniometer measurement.

Inks (E25-E28) Preparation and Printed Security Features Obtained Thereof

H0. Preparation of UV-Vis Radiation Curable Ink Vehicle V27-V30 (Table 10A)

TABLE 10A

UV-Vis radiation curable ink vehicles V27-V30

| Ingredient | Commercial name (supplier) | V27 | V28 | V29 | V30 |
|---|---|---|---|---|---|
| Cycloaliphatic epoxide | Uvacure ® 1500 | 54.5 | 44.5 | 39.5 | 34.5 |
| Vinyl ether | DVE-2 | 5 | 5 | 5 | 5 |
| Oxetane | Curalite ™ Ox | 5 | 5 | 5 | 5 |
| Tetraacrylate | MIRAMER M4004 | 20 | 20 | 20 | 20 |
| Polyhydroxy compound | POLYOL R4631 | 0 | 10 | 15 | 20 |
| Cationic photoinitiator | Omnicat 440 | 4.13 | 4.13 | 4.13 | 4.13 |
| Free radical photoinitiator | Omnirad 1173 | 4.58 | 4.58 | 4.58 | 4.58 |
| Sensitizer | GENOCURE ® ITX | 0.46 | 0.46 | 0.46 | 0.46 |
| Filler | Aerosil ® 200 | 2.0 | 2.0 | 2.0 | 2.0 |
| Antifoaming agent | Tego ® Airex 900 | 2.5 | 2.5 | 2.5 | 2.5 |
| Solvent | Propylene carbonate | 1.83 | 1.83 | 1.83 | 1.83 |
| Viscosity/mPas | | 217 | 294 | 398 | 390 |

Ingredients of the respective ink vehicles V27-V30 provided in Table 10A were mixed and dispersed at room temperature using a Dispermat (model CV-3) for 15 minutes at 1000-1500 rpm so as to yield 100 g of the respective ink vehicle.

Viscosity values provided in Table 10A were independently measured on about 15 g of the ink vehicle at 25° C. on a Brookfield viscometer (model "DV-I Prime", spindle S21 at 100 rpm).

H1. Preparation of UV-Vis Radiation Curable Screen Printing Security Inks (E25-E28)

The UV-Vis radiation curable screen printing security inks (E25-E28) according to the invention and were prepared with the respective ink vehicle V27-V30 described in Table 10A and flakes P1 b. The security ink E26 was identical to the ink E1 of Table 3B and was prepared at the same time as the inks E25-E28.

17 wt-% of the flakes P1b were independently added to 83 wt-% of the respective ink vehicle V23-V27 and dispersed at room temperature using a Dispermat (model CV-3) for 5 minutes at 800-1000 rpm so as to independently obtain 20 g of the UV-Vis radiation curable screen printing security inks (E25-E28) according to the invention described in Table 10B.

H2. Preparation and Optical Properties of Security Features Made from the Inks E25-E28 (Table 10B)

The UV-Vis radiation curable screen printing security inks (E25-E28) according to the invention were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer as described under items A3-a and A3-b and are provided in Table 10B.

H3. Results

TABLE 10B

Optical properties of the security features made from the inks E25-E28

| Sample No | Ink vehicle | Visual assessment | | Goniometer (Phyma) | |
|---|---|---|---|---|---|
| | | Chroma | Color travel | C* 22.5/22.5 | C. ° 45/45 |
| E25 | V27 | Sufficient | Good | 46 | 36 |
| E26 | V28 | Sufficient | Sufficient | 43 | 34 |
| E27 | V29 | Good | Good | 46 | 36 |
| E28 | V30 | Excellent | Good | 49 | 38 |

As shown in Table 10B, the UV-Vis radiation curable screen printing security inks according to the invention comprising one or more polyhydroxy compounds having more than two hydroxyl groups in an amount of less than or equal to 25 wt-% (the weight percent being based on the total weight of the ink vehicle) exhibited a sufficient to excellent visual aspect and high values for the goniometer measurement.

Inks (E29-E30) Preparation and Printed Security Features Obtained Thereof

I0. Preparation of UV-Vis Radiation Curable Ink Vehicles V31-V32 (Table 11A)

TABLE 11A

UV-Vis radiation curable ink vehicles V31-V32

| Ingredient | Commercial name (supplier) | V31 wt-% | V32 wt-% |
|---|---|---|---|
| Cycloaliphatic epoxide | Uvacure ® 1500 | 44.5 | 44.5 |
| Vinyl ether | DVE-2 | 5 | 5 |
| Oxetane | Curalite ™ Ox | 5 | 5 |
| Tetraacrylate | MIRAMER M4004 | 20 | 20 |
| Polyhydroxy compound | POLYOL R4631 | 10 | — |
| Polyhydroxy compound | Boltorn ™ P1000 | — | 10 |
| Cationic photoinitiator | Omnicat 440 | 4.13 | 4.13 |
| Free radical photoinitiator | Omnirad 1173 | 4.58 | 4.58 |
| Sensitizer | GENOCURE ® ITX | 0.46 | 0.46 |
| Filler | Aerosil ® 200 | 2.0 | 2.0 |
| Antifoaming agent | Tego ® Airex 900 | 2.5 | 2.5 |
| Solvent | Propylene carbonate | 1.83 | 1.83 |
| Viscosity/mPas | | 517 | 687 |

Ingredients of the respective ink vehicles V31-V32 provided in Table 11A were mixed and dispersed at room temperature using a Dispermat (model CV-3) for 15 minutes at 1000-1500 rpm so as to yield 100 g of the respective ink vehicle.

Viscosity values provided in Table 11A were independently measured on about 15 g of the ink vehicle at 25° C. on a Brookfield viscometer (model "DV-1 Prime", spindle S27 at 100 rpm).

I1. Preparation of UV-Vis Radiation Curable Screen Printing Security Inks (E29-E30)

The UV-Vis radiation curable screen printing security inks (E29-E30) according to the invention and were prepared with the respective ink vehicle V31-V32 described in Table 11A and flakes P1 b. The security ink E29 was identical to the ink E1 of Table 3B and was prepared at the same time as the ink E30.

17 wt-% of the flakes P1b were independently added to 83 wt-% of the respective ink vehicle V31-32 and dispersed at room temperature using a Dispermat (model CV-3) for 5 minutes at 800-1000 rpm so as to independently obtain 20 g of the UV-Vis radiation curable screen printing security inks (E29-E30) according to the invention.

I2. Preparation and Optical Properties of Security Features Made from the Inks E29-E30 (Table 11B)

The UV-Vis radiation curable screen printing security inks (E29-E30) according to the invention were independently applied by hand on a piece of fiduciary paper (BNP paper from Louisenthal, 100 g/m$^2$, 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm$^2$+mercury lamp 200 W/cm$^2$).

The optical properties of the security features described above were determined both visually and using the goniometer as described under items A3-a and A3-b and are provided in Table 11B.

I3. Results

TABLE 11B

Optical properties of the security features made from the inks E29-E30

| Sample No | Ink vehicle | Visual assessment | | Goniometer (Phyma) | |
|---|---|---|---|---|---|
| | | Chroma | Color travel | C* 22.5/22.5 | C. ° 45/45 |
| E29 | V31 | Good | Good | 40 | 33 |
| E30 | V32 | Good | Excellent | 44 | 35 |

As shown in Table 11B, the UV-Vis radiation curable screen printing security inks according to the invention comprising either a tetrafunctional polyhydroxy compound (Perstorp POLYOL R4631/E29) or a dendritic polyhydroxy derivative of a polyester (Perstorp Boltorn™ P1000/E30) in an amount of less than or equal to 25 wt-% (the weight percent being based on the total weight of the ink vehicle) exhibited a good to excellent visual aspect and high values for the goniometer measurement.

Inks (E31-E40) Preparation and Printed Security Features Obtained Thereof

J1. Preparation of the UV-Vis Radiation Curable Screen Printing Security Inks (E31-E40)

The UV-Vis radiation curable screen printing security inks E31, E33, E35, E37 and E39 according to the invention were prepared with the ink vehicle V4 described in Table 5A (UV-Vis radiation cationically curable security inks).

The UV-Vis radiation curable screen printing security inks E32, E34, E36, E38 and E40 according to the invention were prepared with the ink vehicle V0 described in Table 3A-2 (UV-Vis radiation hybrid curable security inks).

The security inks E31-E32 and E35-E38 contained the pigment P2b (treated Pyrisma® Yellow, Table 1). The security inks E33-E34 and E39-E40 contained the pigment P1b (treated ChromaFlair® Blue-to-Red, Table 1).

The security inks E35 and E36 additionally contained an IR-absorbing compound, allowing the preparation of IR-detectable security features.

The security inks E37-E40 additionally contained a soft-magnetic light shade material, allowing the preparation of magnetically detectable security features.

To prepare the security inks E31-E34, 17 wt-% of the respective treated flakes (P1b or P2b) were independently added to 83 wt-% of the respective ink vehicles V0 and V4 and dispersed at room temperature using a Dispermat (model CV-3) for 5 minutes at 800-1000 rpm so as to independently obtain 20 g of the UV-Vis radiation curable screen printing security inks (E31-E34).

To prepare the security inks E35-E36, 17 wt-% of the treated flakes P2b and 9 wt-% of an IR-absorbing compound were independently added to 74 wt-% of the respective ink vehicles V0 and V4 and dispersed at room temperature using a Dispermat (model CV-3) for 5 minutes at 800-1000 rpm so as to independently obtain 20 g of the UV-Vis radiation curable screen printing security inks comprising an IR-absorbing compound (E35-E36).

To prepare the security inks E37-E40, 17 wt-% of the respective treated flakes (P1 b or P2b) and 6 wt-% of a soft-magnetic light shade material were independently added to 77 wt-% of the respective ink vehicles V0 and V4 and dispersed at room temperature using a Dispermat (model CV-3) for 5 minutes at 800-1000 rpm so as to independently obtain 20 g of the UV-Vis radiation curable screen printing security inks comprising a soft-magnetic light shade material (E37-E40).

The composition of the inks is summarized in Table 12A below:

TABLE 12A

Composition of the inks E31-E40

| Inks | Ink vehicle | Vehicle wt-% | Vehicle type | Treated flakes | Flakes wt-% | IR-absorbing compound [a] [wt-%] | Soft-magnetic material [b] [wt-%] |
|---|---|---|---|---|---|---|---|
| E31 | V4 | 83 | cationic | P2b [c] | 17 | — | — |
| E32 | V0 | 83 | hybrid | P2b | 17 | — | — |
| E33 | V4 | 83 | cationic | P1b [d] | 17 | — | — |
| E34 | V0 | 83 | hybrid | P1b | 17 | — | — |
| E35 | V4 | 74 | cationic | P2b | 17 | 9 | — |
| E36 | V0 | 74 | hybrid | P2b | 17 | 9 | — |
| E37 | V4 | 77 | cationic | P2b | 17 | — | 6 |
| E38 | V0 | 77 | hybrid | P2b | 17 | — | 6 |
| E39 | V4 | 77 | cationic | P1b | 17 | — | 6 |
| E40 | V0 | 77 | hybrid | P1b | 17 | — | 6 |

[a] Shandong Sparrow, copper hydroxide phosphate $Cu_2PO_4(OH)$ (CAS-Nr. 12158-74-6), 80% of particles <10 μm (laser diffraction)
[b] core-shell light shade magnetic particles prepared as described in paragraph [083] of WO 2017/129666 A1, comprising a carbonyl iron magnetic core, a $TiO_2$ coating and an Ag coating. Particle size d50 1-12 μm (laser diffraction)
[c] Pyrisma ® Yellow T30-20 (Merck) treated with 4wt-% Fluorolink ® P54 (Solvay) according to method 1b (Table 1)
[d] ChromaFlair ® blue-to-red (Viavi Solutions) treated with 2wt-% Fluorolink ® P54 (Solvay) according to method 1a (Table 1)

J2. Preparation and Properties of Security Features Made from the Inks E31-E40 (Table 12B)

The UV-Vis radiation curable screen printing security inks (E31-E40) according to the invention were independently applied by hand on a piece of fiduciary paper (BNP paper from Louisenthal, 100 g/m², 14.5 cm×17.5 cm) using a 90 thread/cm screen (230 mesh).

The printed pattern had a size of 6 cm×10 cm. After the printing step, the security features made of the UV-Vis radiation curable screen printing security inks were independently cured by exposing said features two times at a speed of 100 m/min to UV-Vis light under a dryer from IST Metz GmbH (two lamps: iron-doped mercury lamp 200 W/cm²+mercury lamp 200 W/cm²).

The VIS-IR reflectance spectrum of security features made with the inks E31, E32, E35 and E36 was independently measured with a DC45 from Datacolor between 400 nm and 1100 nm. The 100% reflectance was measured using the internal standard of the device. Reflectance values [%] at selected wavelengths are provided in Table 12B. As shown in Table 12B, the reflectance values exhibited in the 400-600 nm wavelength domain by the security features obtained from the inks E35 and E36 containing the treated Pyrisma® Yellow pigment and the IR-A absorbing compound are comparable with the reflectance values exhibited by the security features obtained from the inks E31 and E32 lacking the IR-absorbing compound. In the 700-1100 nm wavelength domain, the reflectance exhibited by the security features obtained from the inks E35 and E36 containing the treated Pyrisma® Yellow pigment and the IR-A absorbing compound is significantly lower than the one exhibited by the security features obtained from the inks E31 and E32 lacking said IR-absorbing compound, thereby enabling the authentication of the security features obtained from the inks E35 and E36 on the basis of the IR-absorbing property characteristic to the IR-absorbing compound contained by the inks E35 and E36.

TABLE 12B

VIS-IR reflectance values [%] at selected wavelengths of security features made of the inks E31, E32, E35 and E36

| Reflectance [%] at | E31 | E32 | E35 | E36 |
| --- | --- | --- | --- | --- |
| 400 nm | 29.6 | 30.3 | 26.7 | 22.3 |
| 500 nm | 79.8 | 80.5 | 75.5 | 74.7 |
| 600 nm | 82.2 | 84.4 | 79.1 | 76.8 |
| 700 nm | 82.1 | 85.0 | 65.1 | 63.0 |
| 800 nm | 83.5 | 86.4 | 49.7 | 47.6 |
| 900 nm | 82.9 | 85.5 | 40.9 | 39.2 |
| 1000 nm | 79.7 | 82.2 | 37.7 | 36.0 |
| 1100 nm | 79.8 | 82.9 | 36.5 | 34.7 |

The magnetic moment (in emu) as a function of the applied magnetic field (in Oe) exhibited by each of the security features obtained from the inks E31-E34 (lacking the soft-magnetic light shade pigment) and E37-E40 (comprising the soft-magnetic light shade pigment) was measured using a vibrating sample magnetometer (Lake Shore Cryotronics Inc., 575 McCorkle Blvd, Westerville, OH 43082, USA, 7400 Series). The measurement was conducted by applying a magnetic field varied between 0 and 10'0000e to a Ø05 mm surface sample stamped from the security feature and reading the saturation magnetization value at 10'0000e. As expected, the security features obtained from the inks E31-E34 lacking the soft-magnetic light shade material did not exhibit a magnetic signal. The security features obtained from the inks E37-E40 containing the soft-magnetic light shade material exhibited a magnetic signal characteristic to the soft-magnetic light shade material, thereby enabling the authentication of said security features on the basis of the magnetic property characteristic to the soft-magnetic light shade material contained by the inks E37-E40. Inks E37-E40 show magnetic properties similar to the ones of inks used for producing security features authenticable by banknote accepting machines.

The optical properties of the security features described above were determined both visually and using the goniometer as described under items A3-a and A3-b. Both the IR-absorbing compound and the soft-magnetic light shade material are fully concealed within the ink layer and undetectable with the naked eye. The optical properties exhibited by the security features obtained from the inks E31-E32 containing the treated Pyrisma® Yellow pigment are better than the optical properties exhibited by the security features obtained from the inks E35-E36 containing the treated Pyrisma® Yellow pigment and the IR-A absorbing compound. However, despite the alteration of the optical properties by the IR-absorbing compound, the optical performance of the security features obtained from the inks E35-E36 is acceptable for their use as a reflective security feature. The optical properties of security features obtained from the inks E37-E40 containing either the treated Pyrisma Yellow® pigment and the soft-magnetic light shade material, or the treated Chromaflair® Blue-to-Red pigment and the soft-magnetic light shade material are comparable with the optical properties exhibited by the corresponding security features obtained from the inks E31-E34 lacking the soft-magnetic light shade material.

The invention claimed is:

1. A UV-Vis radiation curable security ink comprising:
   i) from about 75 wt-% to about 99 wt-% of an ink vehicle having a viscosity between about 200 and about 2000 mPas at 25° C. and comprising:
      a) a1) from 45 wt-% to about 75 wt-% of one or more cycloaliphatic epoxides and a2) from about 2 wt-% to about 15 wt-% of one or more cationic photoinitiators being onium salts, or
      b) b1) from 45 wt-% to about 75 wt-% of a mixture comprising one or more cycloaliphatic epoxides and one or more radically curable compounds selected from the group consisting of tri(meth)acrylates, tetra(meth)acrylates and mixtures thereof and b2) from about 2 wt-% to about 15 wt-% of a mixture of one or more cationic photoinitiators being onium salts, and one or more free radical photoinitiators,
      c) the ink vehicle optionally comprising one or more vinyl ethers in an amount less than about 20 wt-%, or one or more oxetanes in an amount less than or equal to about 30 wt-% or a combination of one or more vinyl ethers and one or more oxetanes in an amount less than or equal to about 15 wt-%,
      the weight percents of a), b) and c) being based on the total weight of the ink vehicle; and
   ii) from about 1 to about 25 wt-% of pigments comprising a flake-shaped non-metallic or metallic substrate, wherein said non-metallic or metallic substrate comprises one or more at least partial coating layers independently made of one or more metal oxides, one or more metal oxide hydrates, one or more metal suboxides or mixtures of these materials and comprises an at least partial surface treatment layer facing the environment, being in direct contact with the top layer of the one or more at least partial coating layers and made of one or more surface modifiers selected from perfluoropolyethers, said perfluoropolyethers being functionalized with one or more phosphor (P) containing groups or one or more silicon (Si) containing groups,
   the weight percent of i) and ii) being based on the total weight of UV-Vis radiation curable security ink.

2. The UV-Vis radiation curable security ink according to claim 1, wherein the UV-Vis radiation curable security ink is a UV-Vis radiation curable screen printing security ink.

3. The UV-Vis radiation curable security ink according to claim 1, wherein the ink vehicle further comprises c) one or more vinyl ethers in an amount less than about 20 wt-%, or one or more oxetanes in an amount less than or equal to about 30 wt-% or a combination of one or more vinyl ethers and one or more oxetanes, wherein said combination is present in an amount less than or equal to about 15 wt-%, the weight percents of a), b) and c) being based on the total weight of the ink vehicle.

4. The UV-Vis radiation curable security ink according to claim 1, wherein the ink vehicle further comprises one or more polyhydroxy compounds, wherein said one or more polyhydroxy compounds are present in an amount less than or equal to about 25 wt-%, the weight percents being based on the total weight of the ink vehicle.

5. The UV-Vis radiation curable security ink according to claim 1, wherein the ink vehicle comprises from 45 to about 75 wt-% of a mixture comprising one or more cycloaliphatic epoxides and one or more radically curable compounds selected from the group consisting of tri(meth)acrylates, tetra(meth)acrylates and mixtures thereof, wherein said one or more radically curable compounds are present in an amount less than or equal to 35 wt-%, the weight percents being based on the total weight of the ink vehicle.

6. The UV-Vis radiation curable security ink according to claim 1, wherein the pigments comprise a flake-shaped metallic substrate consisting of a multilayer comprising one or more metallic layers, wherein said pigments comprise one or more at least partial coatings independently made of one or more metal oxides.

7. The UV-Vis radiation curable security ink according to claim 6, wherein the ink vehicle further comprises one or more machine readable materials selected from the group consisting of magnetic materials.

8. The UV-Vis radiation security ink according to claim 1, wherein the pigments comprise a flake-shaped non-metallic substrate which is made of one or more materials selected from the group consisting of natural micas, synthetic micas and glasses.

9. The UV-Vis radiation curable security ink according to claim 8, wherein the non-metallic substrate comprises one or more at least partial coatings independently made of one or more metal oxides.

10. The UV-Vis radiation curable security ink according to claim 8, wherein the ink vehicle further comprises one or more machine readable materials selected from the group consisting of magnetic materials and infrared-absorbing materials.

11. The UV-Vis radiation curable security ink according to claim 1, wherein the perfluoropolyethers are functionalized with one or more phosphate containing groups or one or more silane containing groups.

12. The UV-Vis radiation curable security ink according to claim 1, wherein in the one or more cationic photoinitiators of a2), the onium salts are selected from the group consisting of oxonium salts, iodonium salts, sulfonium salts and mixtures thereof, or wherein in the mixture of b2) the onium salts are selected from the group consisting of oxonium salts, iodonium salts, sulfonium salts and mixtures thereof, and the free radical photoinitiators are selected from the group consisting of hydroxyketones, alkoxyketones, acetophenones, benzophenones, ketosulfones, benzyl ketals, benzoin ethers, phosphine oxides, phenylglyoxylates, thioxanthones, and mixtures thereof.

13. The UV-Vis radiation curable security ink according to claim 4, wherein the one or more polyhydroxy compounds comprise more than two hydroxyl groups.

14. The UV-Vis radiation curable security ink according to claim 5, wherein said one or more radically curable compounds are present in an amount less than or equal to 30 wt-%.

15. The UV-Vis radiation curable security ink according to claim 6, wherein the multilayer comprises thin film interference multilayers having a Fabry-Perot absorber/dielectric/reflector/dielectric/absorber structure.

* * * * *